(12) United States Patent
Ikebuchi

(10) Patent No.: US 9,557,159 B2
(45) Date of Patent: Jan. 31, 2017

(54) OPTICAL COORDINATE MEASURING DEVICE

(71) Applicant: Keyence Corporation, Osaka (JP)

(72) Inventor: Masayasu Ikebuchi, Osaka (JP)

(73) Assignee: Keyence Corporation, Osaka (JP)

( * ) Notice: Subject to any disclaimer, the term of this patent is extended or adjusted under 35 U.S.C. 154(b) by 36 days.

(21) Appl. No.: 14/631,877

(22) Filed: Feb. 26, 2015

(65) Prior Publication Data

US 2015/0276377 A1    Oct. 1, 2015

(30) Foreign Application Priority Data

Mar. 28, 2014 (JP) ................. 2014-069858

(51) Int. Cl.
| | | |
|---|---|---|
| *G01B 11/14* | (2006.01) | |
| *G01B 11/00* | (2006.01) | |
| *G01B 5/008* | (2006.01) | |

(52) U.S. Cl.
CPC ............. *G01B 11/005* (2013.01); *G01B 5/008* (2013.01)

(58) Field of Classification Search
USPC .................................................. 356/614–640
See application file for complete search history.

(56) References Cited

U.S. PATENT DOCUMENTS

| | | |
|---|---|---|
| 5,440,392 A | 8/1995 | Pettersen et al. |
| 5,805,287 A | 9/1998 | Pettersen et al. |
| 5,973,788 A | 10/1999 | Pettersen et al. |
| 6,166,809 A | 12/2000 | Pettersen et al. |
| 6,389,158 B1 | 5/2002 | Pettersen et al. |
| 8,874,406 B2 | 10/2014 | Rotvold et al. |

*Primary Examiner* — Tri T Ton
(74) *Attorney, Agent, or Firm* — Kilyk & Bowersox, P.L.L.C.

(57) ABSTRACT

Provided is an optical coordinate measuring device that prevents deterioration in measurement accuracy. A holding member is made of a material having low moisture absorption properties and a small linear expansion coefficient. A marker member is held by the holding member. The marker member includes a plate member made of glass. A light shielding mask is formed by printing on one surface of the plate member except for a plurality of circular regions. A light emitting substrate is arranged below the marker member. A plurality of light emitting elements are mounted on the upper surfaces of the light emitting substrates.

12 Claims, 17 Drawing Sheets

OPTICAL COORDINATE MEASURING DEVICE

CROSS-REFERENCE TO RELATED APPLICATIONS

The present application claims foreign priority based on Japanese Patent Application No. 2014-069858, filed Mar. 28, 2014, the contents of which is incorporated herein by reference.

BACKGROUND OF THE INVENTION

1. Field of the Invention

The present invention relates to an optical coordinate measuring device using a probe.

2. Description of Related Art

An optical coordinate measuring device is provided with a probe for designating a measurement position. An arbitrary position of a measurement target is designated as a measurement position by the probe, and coordinates of the measurement position are calculated. By calculating coordinates of a plurality of measurement positions on the measurement target, a size of a desired portion of the measurement target is measured.

JP 06-511555 A describes a system for point by point measurement of spatial coordinates, which includes a data processor, a contact probe, and an angle sensor. The contact probe is provided with a plurality of point light sources in addition to a contact point. The angle sensor is provided so as to allow observation of an essential portion of a measurement target and allow observation of the plurality of point light sources of the contact probe.

A spatial direction from the angle sensor toward each light source is recorded. Based on the recorded spatial direction, a position and an orientation of the contact probe with respect to the angle sensor are calculated by a data processor. The position of the contact probe and a position of the contact point are associated with a position of the measurement target.

In the system for point by point measurement in JP 06-511555 A, there is a possibility that the positional relationship among the plurality of light sources minutely changes. In this case, it becomes impossible to accurately specify the position of the contact probe. As a result, the accuracy in measurement of the coordinates deteriorates.

SUMMARY OF THE INVENTION

An object of the present invention is to provide an optical coordinate measuring device that prevents deterioration in measurement accuracy.

(1) An optical coordinate measuring device according to the present invention includes: a probe which has a plurality of markers and is configured to designate a measurement position; an imaging unit which captures images of the plurality of markers of the probe, to generate image data; and a calculation unit which calculates coordinates of a measurement position designated by the probe based on the image data generated by the imaging unit, wherein the probe includes a light source, a plurality of light transmitting portions each having a light transmitting region that constitutes each marker, and made of glass that transmits light emitted by the light source, a light shielding film which is formed on the surfaces of the plurality of light transmitting portions except for each of the light transmitting regions so as to form an outer shape of the marker, and a holding part which holds the plurality of light transmitting portions.

In this optical coordinate measuring device, image data is generated by capturing images of the plurality of markers of the probe by the imaging unit. Based on the generated image data, a measurement position designated by the probe is calculated by the calculation unit.

The marker is configured by the light transmitting region of each light transmitting portion, and the light shielding film is formed on the surface of a region of each light transmitting portion except for the light transmitting region. Out of light emitted by the light source, light passing through the light transmitting regions of the plurality of light transmitting portions are emitted to the outside of the probe without being shielded by the light shielding film.

In this case, each light transmitting portion is made of glass, thereby preventing a time-dependent dimensional change in each light transmitting portion due to moisture absorption. Further, since the plurality of light transmitting portions are held by the holding part, the positional relationship among the plurality of light transmitting portions can be kept constant.

Moreover, the outer shape of the marker is formed by the light shielding film formed on the glass surface, thereby making a thickness of the light shielding film small and preventing the outer shape of the image of the marker obtained by imaging from being distorted by an edge of the light shielding film. Hence, it is possible to accurately capture an image of a position of each marker.

It is thereby possible to accurately calculate coordinates of the measurement position designated by the probe based on the image data of the plurality of markers.

(2) The holding part may be made of one or a plurality of materials selected from glass, metal, alloy, ceramic, and glass ceramic.

In this case, since the holding part has low moisture absorption properties and a linear expansion coefficient, a dimensional change in the holding part due to moisture absorption and heat is prevented. Therefore, the positional relationship among the plurality of light transmitting portions is kept constant, and the positional relationship among the plurality of markers is kept constant. It is thus possible to accurately calculate coordinates of the measurement position designated by the probe based on the image data of the plurality of markers.

(3) The holding part may be made of quartz glass.

In this case, the dimensional change in the holding part due to moisture absorption and heat is more sufficiently prevented. Hence, the positional relationship among the plurality of light transmitting portions is kept.

(4) The plurality of light transmitting portions and the holding part may be made of the same material.

In this case, there hardly occurs distortion between the plurality of light transmitting portions and the holding part due to a difference in the linear expansion coefficient therebetween, thereby increasing dimensional stability of the plurality of light transmitting portions and the holding part.

(5) Each of the light transmitting portions may be made of plate glass, and the light shielding film may be formed only on one surface of each of the light transmitting portions.

In this case, light to obliquely pass through the light transmitting region and to be emitted to the outside of the probe is prevented from being shielded by the edge of the light shielding film. This sufficiently prevents distortion of the image of the marker.

(6) The light shielding film may be a vapor deposition film.

In this case, the thickness of the light shielding film can be made extremely small. Thereby, light to obliquely pass through the light transmitting region and to be emitted to the outside of the probe is prevented from being shielded by the edge of the light shielding film. This sufficiently prevents distortion of the image of the marker.

(7) The probe may further include a diffusion member which is provided between the light source and each of the light transmitting portions, and which diffuses and transmits light emitted by the light source.

In this case, light can be emitted in various directions through the light transmitting region.

(8) The probe may further include a housing which houses the holding part, and a buffer member having flexibility may be arranged between the holding part and the housing.

In this case, stress is not directly applied to the holding part from the outside. Further, even when an impact is applied to the housing due to falling, collision, or the like of the probe, the impact transmitted to the holding part is reduced by the buffer member. This prevents damage to the holding part.

According to the present invention, deterioration in measurement accuracy due to a dimensional change in the probe is prevented.

BRIEF DESCRIPTION OF THE DRAWINGS

DETAILED DESCRIPTION OF PREFERRED EMBODIMENTS (1) Configuration of Optical Coordinate Measuring Device FIG. 2 is a perspective view showing a configuration of a measurement head of an optical coordinate measuring device 300 of FIG. 1. FIG. 3 is a perspective view showing a configuration of a probe of a measurement head 100 of FIG. 2. Hereinafter, the optical coordinate measuring device 300 according to the present embodiment will be described with reference to FIGS. 1 to 3. As shown in FIG. 1, the optical coordinate measuring device 300 is provided with the measurement head 100 and a processing device 200. The measurement head 100 includes a holding part 110, a placement table 120, a main imaging unit 130, a probe 140, a sub-imaging unit 150, a display unit 160, an operation unit 170, and a control board 180.

As shown in FIG. 2, the holding part 110 of the measurement head 100 includes an installation part 111 and a stand part 112. The installation part 111 has a horizontal flat shape and is installed on the installation surface. The stand part 112 is provided so as to extend upward from one end of the installation part 111.

The placement table 120 is provided at the other end of the installation part 111. The placement table 120 is an optical surface plate, for example. A measurement target S is placed on the placement table 120. In this example, the placement table 120 has a substantially square shape. On the placement table 120, a plurality of screw holes are formed so as to be arrayed at regular intervals in two directions orthogonal to each other. Hence, it is possible to fix the measurement target S to the placement table 120 by means of a cramp member and fixing screws. The placement table 120 may have magnetism. In this case, it is possible to fix the measurement target S to the placement table 120 by means of a fixing member using a magnet such as a magnet base. Further, the upper surface of the placement table 120 may have adhesiveness. Also in this case, the measurement target S can be easily fixed to the placement table 120.

Figure 4A:
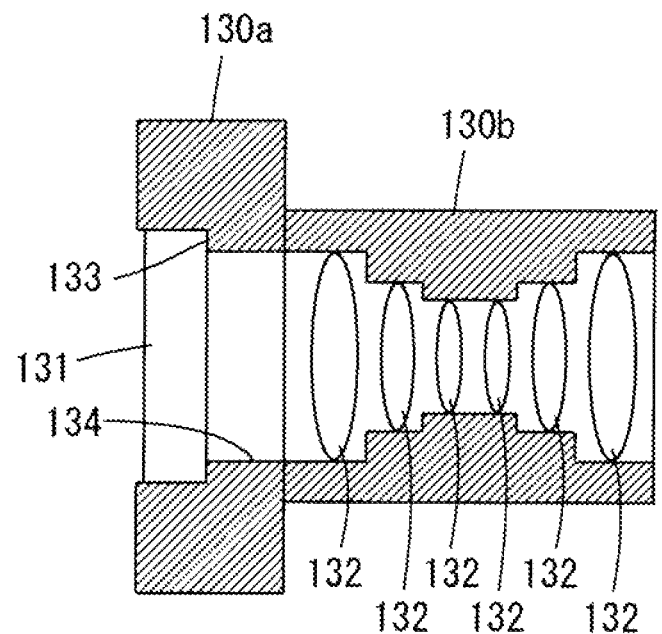
FIGS. 4A and 4B are views for describing a configuration of a main imaging unit.

The main imaging unit 130 is provided on an upper part of the stand part 112. The main imaging unit 130 may be detachably provided on the upper part of the stand part 112, or may be provided integrally with the stand part 112. The main imaging unit 130 includes an imaging element 131 (FIGS. 4A and 4B described later) and a plurality of lenses 132 (FIG. 4A described later). In the present embodiment, the imaging element 131 is a CMOS (complementary metal-oxide-semiconductor) image sensor capable of detecting infrared rays. The main imaging unit 130 is arranged so as to be turned obliquely downward such that it can detect infrared rays emitted from a previously set imaging region V (FIG. 5 described later).

Figure 1:
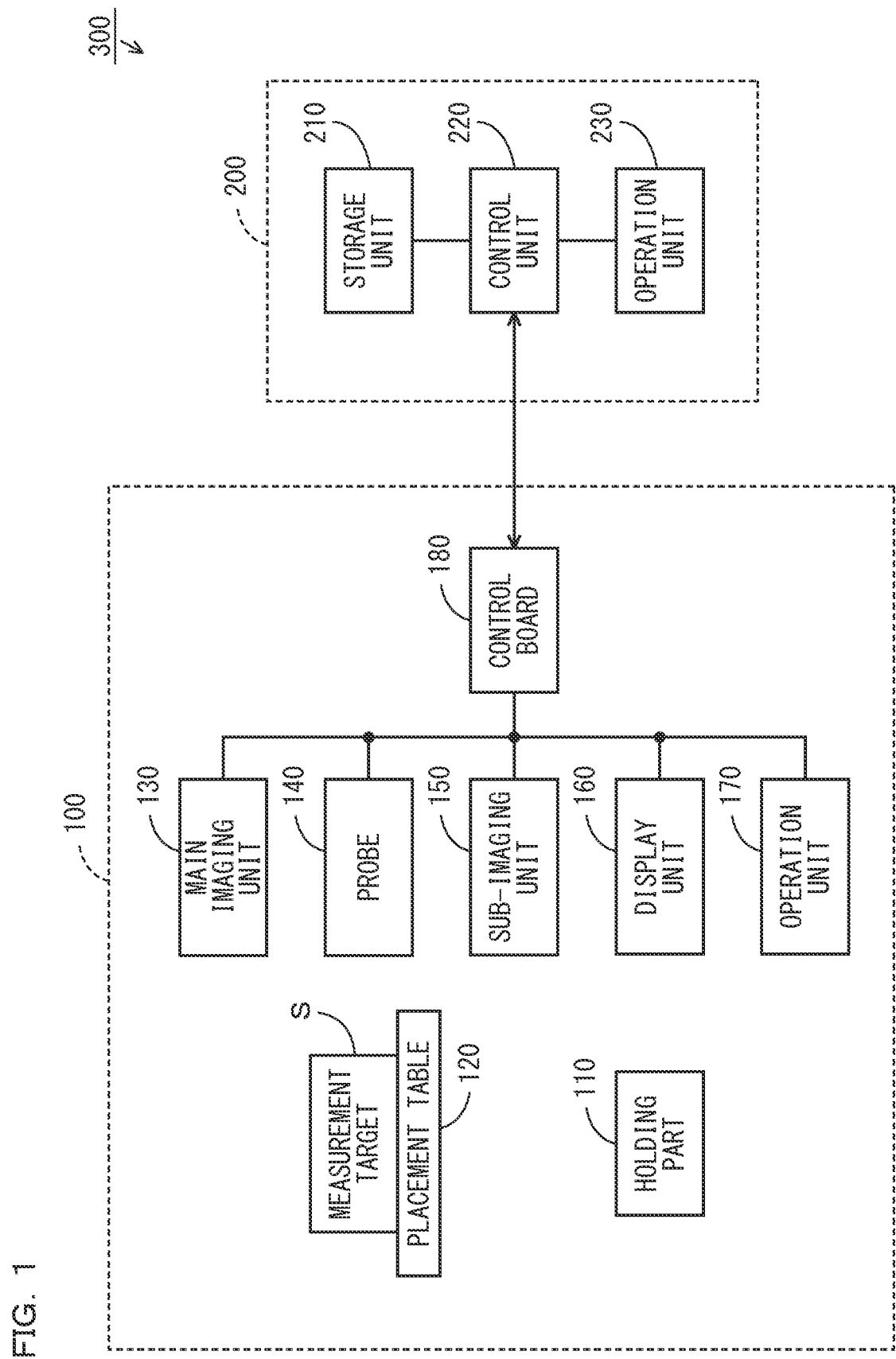
FIG. 1 is a block diagram showing a configuration of an optical coordinate measuring device according to one embodiment of the present invention.

The imaging region V (FIG. 5) is a certain region including the placement table 120 of the installation part 111 and its periphery. In the present embodiment, the placement table 120 of FIG. 1 and a region projecting from the placement table 120 only by a dimension of an overall length of the probe 140 of FIG. 1 are defined as the imaging region V. Note that the overall length of the probe 140 is approximately 150 mm, for example. An analog electric signal (hereinafter referred to as light reception signal) corresponding to a detected amount is outputted from each pixel of the main imaging unit 130 to the control board 180.

Figure 3:
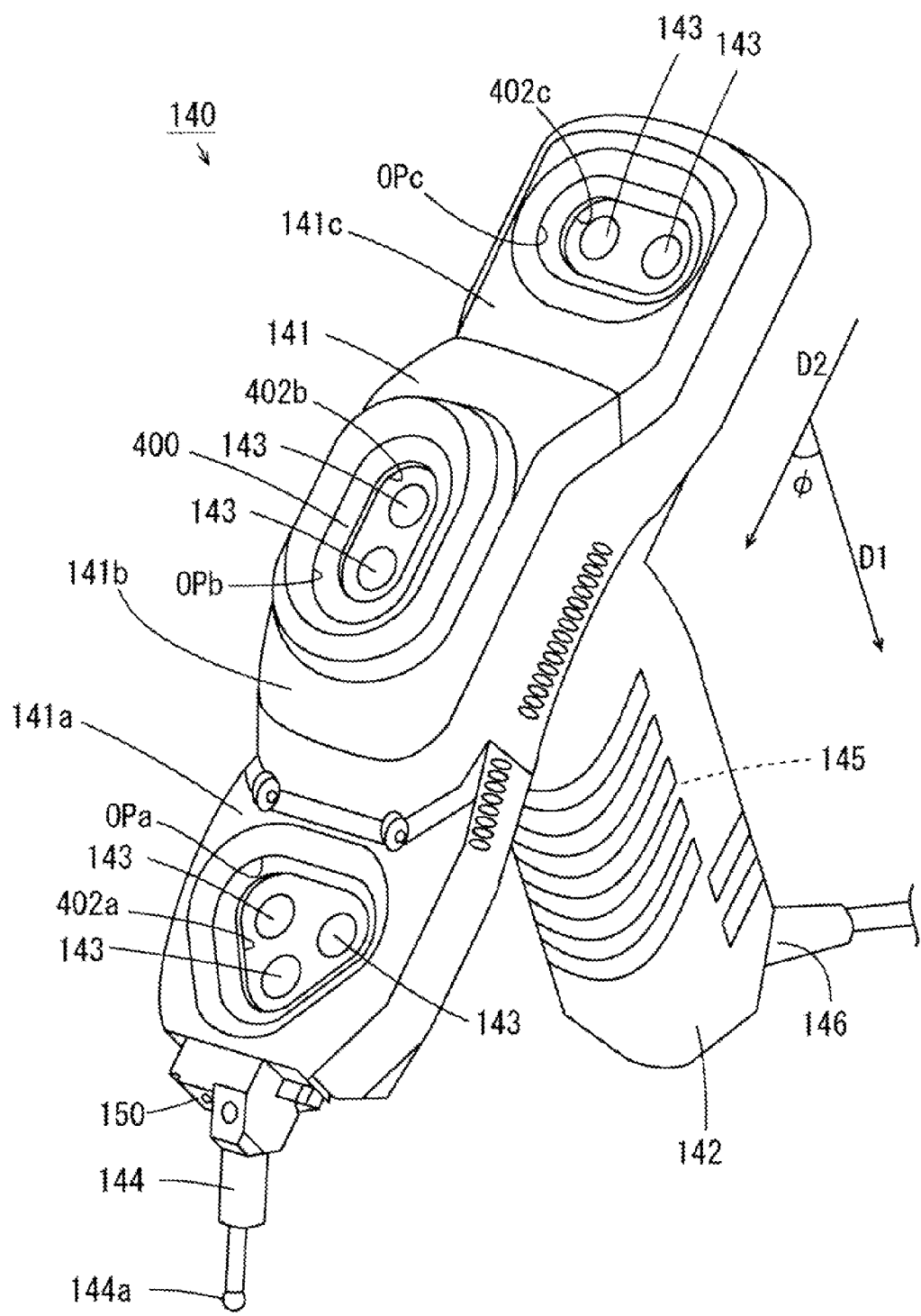
FIG. 3 is a perspective view showing a configuration of a probe of the measurement head of FIG. 2.

As shown in FIG. 3, the probe 140 includes a housing 141, a grip part 142, a plurality of markers 143, a stylus 144, a power supply board 145, and a connection terminal 146. The grip part 142 extends in a first direction D1, and the housing 141 extends in a second direction D2 intersecting with the first direction D1. A user grips the grip part 142 and operates the probe 140.

Hereinafter, unless specifically mentioned, the top, bottom, front, and rear of the probe 140 indicate the top, bottom, front, and rear of the probe 140 in a state where the user vertically holds the grip part 142 (state where the first direction D1 is a vertical direction).

The housing 141 is provided at the upper end of the grip part 142. The grip part 142 extends downward from the central part of the lower surface of the housing 141 such that a front portion of the housing 141 projects in front of the grip part 142 and a rear portion of the housing 141 projects behind the grip part 142. Here, an angle formed by the first direction D1 and the second direction D2 is defined as an angle φ formed by the grip part 142 and the front portion of the housing 141. In the present embodiment, the angle φ is an acute angle, being larger than 0° and smaller than 90°.

In the state where the grip part 142 is vertically held, the front end of the housing 141 is located below the rear end of the housing 141, and the upper surface of the housing 141 is inclined obliquely downward from the rear end to the front end. In this case, the user can easily turn the upper surface of the housing 141 obliquely upward.

In the present embodiment, the upper surface of the housing 141 includes a front-part upper surface 141a, a central-part upper surface 141b, and a rear-part upper surface 141c. The front-part upper surface 141a, the central-part upper surface 141b, and the rear-part upper surface 141c are parallel to the second direction D2. Further, the front-part upper surface 141a, the central-part upper surface 141b, and the rear-part upper surface 141c are vertical to a plane including the first and second directions D1, D2. The front-part upper surface 141a and the rear-part upper surface 141c are on the same plane, and the central-part upper surface 141b is at a position higher than the front-part upper surface 141a and the rear-part upper surface 141c.

A holding member 400 having a plurality of circular markers 143 is housed inside the housing 141. In this example, the shape of each marker 143 is not limited to a circular shape, and may be other shapes such as a triangular shape, a square shape, or a star shape. The housing 141 is provided with a plurality of openings through which the plurality of markers 143 in the housing 141 are exposed. Details of the holding member 400 and the marker 143 will be described later.

In the example of FIG. 3, seven markers 143 are provided in the holding member 400. Three markers 143 are arranged in the front end of the housing 141, two markers 143 are arranged in the center, and two markers 143 are arranged in the rear end. The front-part upper surface 141a is provided with an opening OPa through which the three markers 143 in the front end are exposed. The central-part upper surface 141b is provided with an opening OPb through which the two markers 143 in the center are exposed. The rear-part upper surface 141c is provided with an opening OPc through which the two markers 143 in the rear end are exposed.

In this example, the three markers 143 in the front end of the housing 141 and the two markers 143 in the rear end are arranged so as to be located on the same plane. Further, the two markers 143 in the center are arranged so as to be located on a plane higher than the plane where the other markers 143 are located.

In this example, each marker 143 periodically emits infrared rays with a wavelength of 860 nm. The infrared rays emitted from the plurality of markers 143 pass through the plurality of openings OPa, OPb, OPc of the housing 141, and images of the infrared rays are captured by the main imaging unit 130 of FIG. 2.

Figure 2:
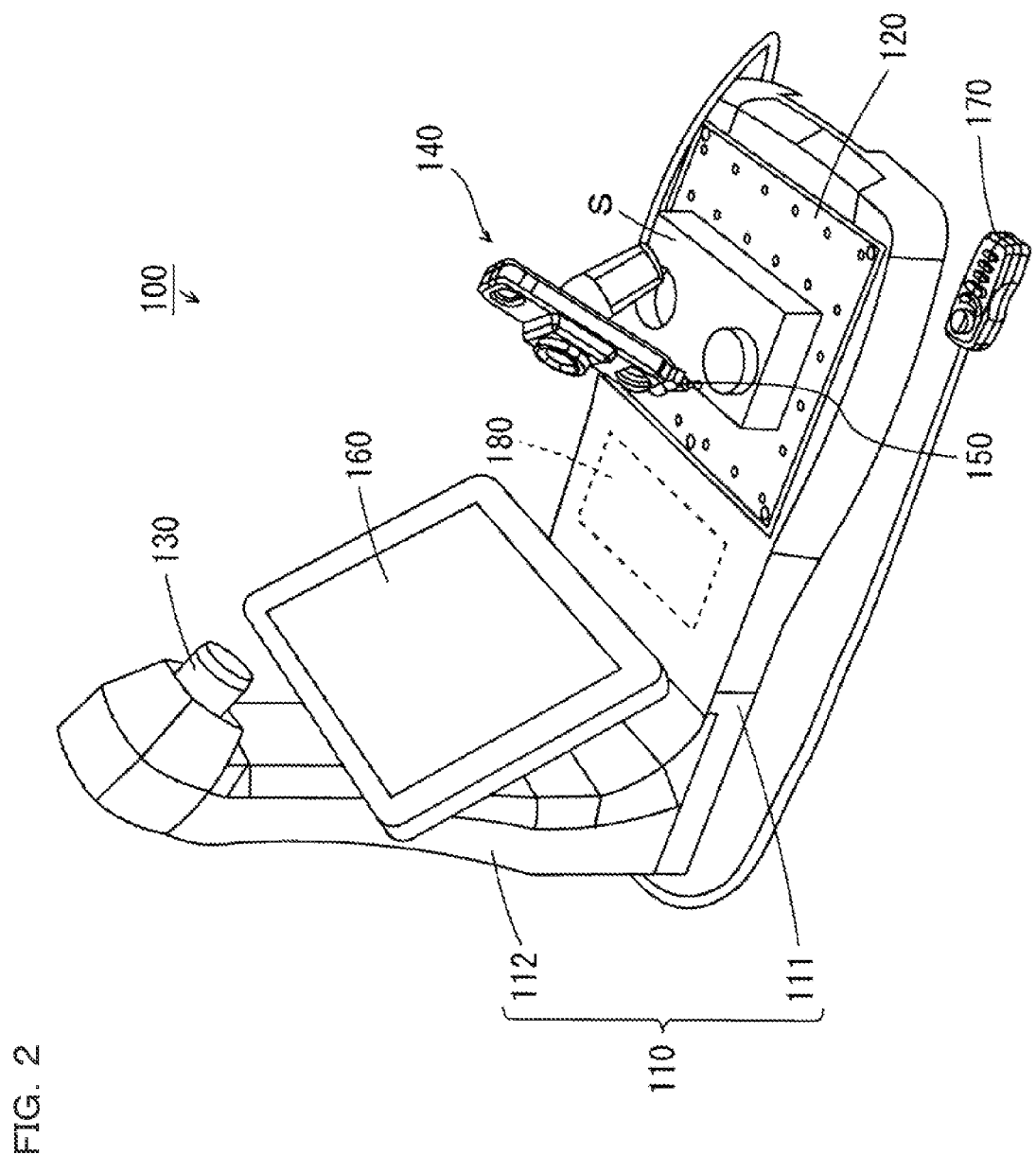
FIG. 2 is a perspective view showing a configuration of a measurement head of the optical coordinate measuring device of FIG. 1.

The main imaging unit 130 of FIG. 2 is located obliquely above the placement table 120. As described above, the user can easily turn the upper surface of the housing 141 obliquely upward. Therefore, the main imaging unit 130 can efficiently capture an image of infrared rays emitted from the plurality of markers 143 of the probe 140 at the time of shape measurement of the measurement target S on the placement table 120.

As shown in FIG. 3, the stylus 144 is a stick member having a contact part 144a that can be brought into contact with the measurement target S. In the present embodiment, a spherical contact part 144a is provided at the tip of the stylus 144. An attachment part, not shown, for attaching the stylus 144 is formed on the front end surface and the lower surface of the housing 141. The user can arbitrarily change an attached position of the stylus 144 between the front end surface and the lower surface of the front end of the housing 141 in accordance with the shape of the measurement target S. In the example of FIG. 3, the stylus 144 is attached to the front end surface of the housing 141.

The power supply board 145 supplies electric power to light emitting substrates 431, 432, 433 (FIG. 6) which will be described later. The power supply board 145 is housed inside the grip part 142. The connection terminal 146 is arranged on a lower part of the grip part 142. Light emitting operations of the plurality of markers 143 are controlled by the control board 180 of FIG. 1 through a cable connected to the connection terminal 146. Note that the probe 140 and the control board 180 may be provided so as to be wirelessly communicable with each other.

The sub-imaging unit 150 is a CCD (charge coupled device) camera, for example. A resolution of the sub-imaging unit 150 may be lower than a resolution of the main imaging unit 130. The sub-imaging unit 150 is arranged in a position whose positional relationship with the contact part 144a of the stylus 144 of the probe 140 is known. In the present embodiment, the sub-imaging unit 150 is arranged on the end surface of the front end of the housing 141 of the probe 140. A light reception signal is outputted from each pixel of the sub-imaging unit 150 to the control board 180.

As shown in FIG. 2, the display unit 160 is supported by the stand part 112 of the holding part 110, and is provided on the installation part 111 such that a display screen of the display unit 160 is turned obliquely upward. Accordingly, the user can selectively view the measurement target S and the display unit 160 by minimum movement of his or her eyes, or view the measurement target S and the display unit 160 at the same time.

The display unit 160 is configured by a liquid crystal display panel or an organic EL (electroluminescence) panel, for example. On the display unit 160, an image generated by the processing device 200, an operating procedure screen for the optical coordinate measuring device 300, a measurement result, and the like are displayed based on control by the control board 180.

The operation unit 170 has a plurality of operation buttons, for example. The operation unit 170 can be operated by the user at the time of designating a portion of the measurement target S to be measured, or at some other time. The operation unit 170 may be provided integrally with the probe 140. For example, in the grip part 142 of FIG. 2, one or a plurality of operation buttons may be provided as the operation unit 170. In this case, the user can operate the operation unit 170 while holding the grip part 142 with one hand.

The control board 180 is provided in the installation part 111 of the holding part 110. The control board 180 is connected to the main imaging unit 130, the probe 140, the sub-imaging unit 150, the display unit 160, and the operation unit 170. The processing device 200 controls operations of the main imaging unit 130, the probe 140, the sub-imaging unit 150, the display unit 160, and the operation unit 170 via the control board 180.

The control board 180 is mounted with an A/D convertor (analog/digital convertor) and a FIFO (first in, first out) memory, which are not shown. Light reception signals outputted from the main imaging unit 130 and the sub-imaging unit 150 are sampled by the A/D convertor of the control board 180 in a constant sampling period and also converted to digital signals. The digital signals outputted from the A/D convertor are sequentially stored into the FIFO memory. The digital signals stored into the FIFO memory are sequentially transmitted as pixel data to the processing device 200.

In the present embodiment, the timing for light emission by the plurality of light markers 143 of FIG. 3 is synchronized with the timing for imaging by the main imaging unit 130 of FIG. 2. Pixel data stored in a light emission period of the plurality of markers 143 is transmitted from the control board 180 to the processing device 200 in a next quenching period of the markers 143.

As shown in FIG. 1, the processing device 200 includes a storage unit 210, a control unit 220, and an operation unit 230. The storage unit 210 includes a ROM (read only memory), a RAM (random access memory), and a hard disk. A system program is stored into the storage unit 210. Further, the storage unit 210 is used for processing a variety of data and storing a variety of data such as pixel data from the measurement head 100.

The control unit 220 includes a CPU (central processing unit). In the present embodiment, the storage unit 210 and the control unit 220 are realized by a personal computer. The control unit 220 generates image data based on the pixel data from the measurement head 100. The image data is an aggregate of plurality of pieces of pixel data. The control unit 220 calculates a position of the contact part 144a of the stylus 144 of the probe 140 based on the generated image data.

The operation unit 230 includes a key board and a pointing device. The pointing device includes a mouse, a joy stick, or the like. The operation unit 230 is operated by the user.

(2) Configuration of Main Imaging Unit

Figure 4B:
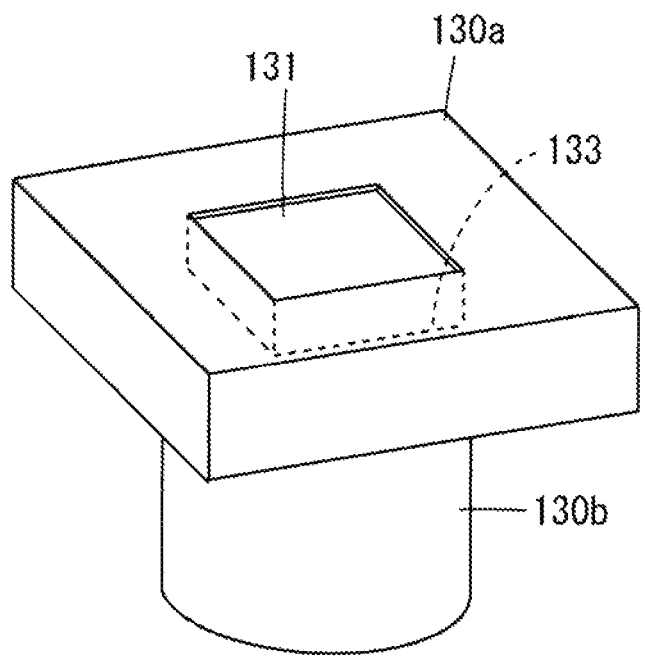
Figure 5:
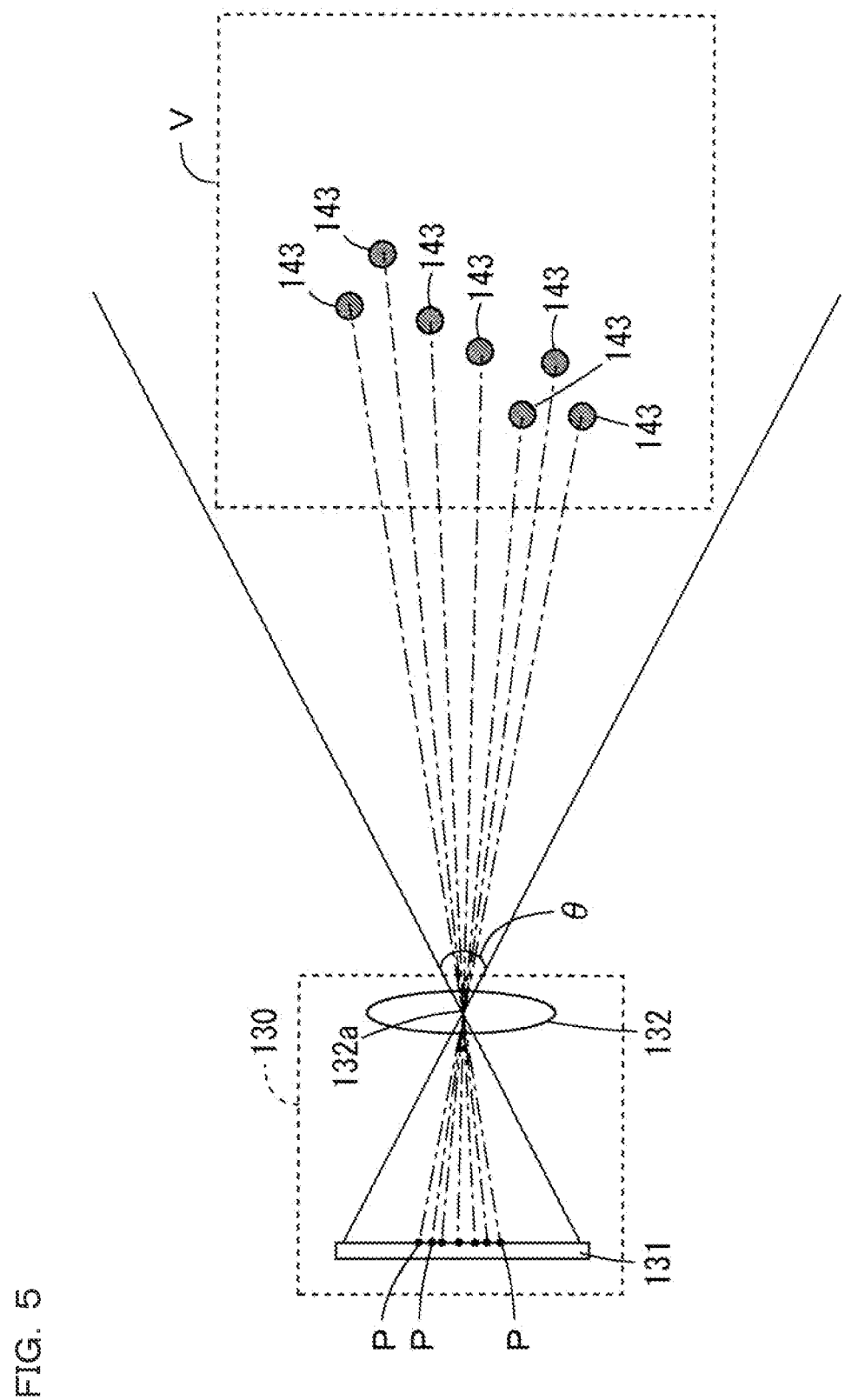
FIG. 5 is a schematic view for describing the relationships between the main imaging unit and a plurality of markers.

FIGS. 4A and 4B are views for describing a configuration of the main imaging unit 130. FIG. 4A is a schematic sectional view of the main imaging unit 130, and FIG. 4B is an external perspective view of the main imaging unit 130.

As shown in FIG. 4A, the main imaging unit 130 is provided with an element holding part 130a, a lens holding part 130b, an imaging element 131, and a plurality of lenses 132. The element holding part 130a and the lens holding part 130b are made of a metal material, for example. The element holding part 130a and the lens holding part 130b may be provided as a common member by integral molding, or may be provided as separate bodies.

A recess 133 having a rectangular cross section is formed on one surface of the element holding part 130a. The imaging element 131 is fitted to the recess 133. In order to prevent positional displacement of the imaging element 131, the imaging element 131 may be fixed in the recess 133. A through hole 134 is formed from the bottom surface of the recess 133 to the other surface of the element holding part 130a which is parallel to the above one surface.

The lens holding part 130b has a cylindrical shape. One end of the lens holding part 130b is fixed to the other surface of the element holding part 130a. The plurality of lenses 132 having various sizes are held in the lens holding part 130b. The plurality of lenses 132 overlap with the through hole 134 of the element holding part 130a, and arranged such that optical axes thereof agree with each other. Light is incident on the imaging element 131 from the other end of the lens holding part 130b through the plurality of lenses 132.

(3) Detection by Main Imaging Unit

As described above, the main imaging unit 130 detects infrared rays emitted from the plurality of markers 143 of the probe 140. FIG. 5 is a schematic view for describing the relationships between the main imaging unit 130 and a plurality of markers 143. In FIG. 5, a description will be given using an optically simplified model having a similar function to that of a pin hole camera model in order to facilitate understanding. FIG. 5 shows only one lens 132 out of the plurality of lenses 132 of the main imaging unit 130, and light is guided to the imaging element 131 so as to pass through a main point 132a of the lens 132.

As shown in FIG. 5, the main imaging unit 130 has a constant angle of view (viewing angle) θ. The imaging region V is included within the range of the angle of view θ of the main imaging unit 130. When each of the plurality of markers 143 are located within the imaging region V, infrared rays emitted from those markers 143 are incident on the imaging element 131 through the main point 132a of the lens 132.

In this case, a direction from the main point 132a of the lens 132 to each marker 143 is specified based on a light reception position P of the imaging element 131. In the example of FIG. 5, as indicated by a dashed line, each marker 143 is located on each straight line passing through each light reception position P and the main point 132a of the lens 132. Further, the relative positional relationship among the plurality of markers 143 is previously stored into the storage unit 210 of FIG. 1, for example.

Based on the direction from the main point 132a of the lens 132 toward each marker 143 and the positional relationship among the plurality of markers 143, a position of the center of each marker 143 is unambiguously decided. Further, in the present embodiment, an x-axis, a y-axis, and a z-axis which are orthogonal to each other are defined, and an absolute position within the imaging region V is represented by three-dimensional coordinates. The control unit 220 of FIG. 1 calculates coordinates of the center of each marker 143 based on the light reception position P of the imaging element 131 and the previously stored positional relationship among the plurality of markers 143.

Based on the calculated coordinates of the center of each marker 143, coordinates of the contact position between the contact part 144a (FIG. 3) of the probe 140 and the measurement target S are calculated by the control unit 220 of FIG. 1.

For example, the positional relationship between the center of each marker 143 and the center of the contact part 144a (FIG. 3) is previously stored into the storage unit 210 of FIG. 1. Based on the calculated coordinates of the center of each marker 143 and the previously stored positional relationship between the center of each marker 143 and the center of the contact part 144a, coordinates of the center of the contact part 144a are specified.

Further, based on the coordinates of the center of each marker 143, an attitude of the probe 140 is specified. An orientation of the stylus 144 is thereby specified. Further, based on a change in coordinates of the center of each marker 143, a moving direction of the contact part 144a is specified. Normally, the contact part 144a is vertically brought close to the plane of the measurement target S with which it is to be brought into contact. Therefore, based on the specified orientation of the stylus 144 and the specified moving direction of the contact part 144a, the relative positional relationship between the center of the contact part 144a and the contact position is estimated. Based on the estimated positional relationship, coordinates of the contact position between the contact part 144a and the measurement target S are calculated from the coordinates of the center of the contact part 144a.

Note that a sensor for detecting a direction of force that is applied from the measurement target S to the contact part 144a may be provided in the probe 140. In this case, it is possible to calculate coordinates of the contact position between the contact part 144a and the measurement target S based on a result of detection by the sensor.

The calculated coordinates vary when there is an individual difference in the positional relationships between the imaging element 131 and the plurality of lenses 132, the positional relationship among the plurality of markers 143, the positional relationships between the plurality of markers 143 and the contact part 144a, or the like. Accordingly, it is preferable to perform calibration for preventing variation due to the individual difference before performing measurement by the optical coordinate measuring device 300.

(4) Internal Configuration of Probe

As described above, the positional relationship among the plurality of markers 143 is previously stored, and based on the positional relationship, various coordinates are calculated from image data generated by the main imaging unit 130. Therefore, when the positional relationship among the plurality of markers 143 changes, accurate coordinates cannot be calculated. Therefore, in the present embodiment, the probe 140 is configured such that the positional relationship among the plurality of markers 143 is kept constant.

Figure 6:
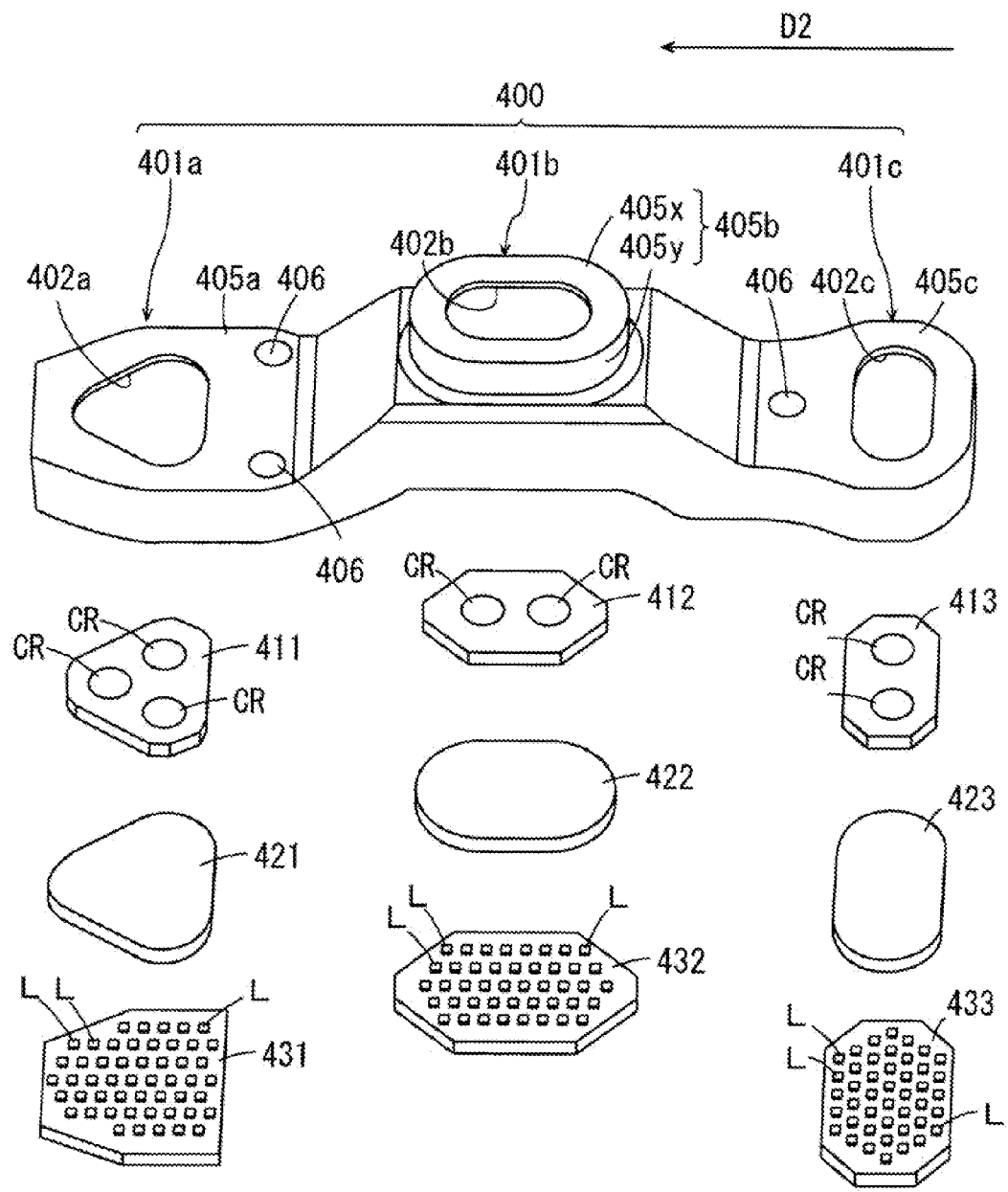
FIG. 6 is an exploded perspective view showing members housed in a housing of the probe.

An internal configuration of the probe 140 will be described. FIG. 6 is an exploded perspective view showing members housed in the housing 141 of the probe 140. In descriptions of FIG. 6 and FIGS. 7 to 12 which will be described later, a vertical direction is a direction which is parallel to a plane including the first and second directions D1, D2 of FIG. 3 and vertical to the second direction D2.

In the housing 141 of FIG. 3, there are housed the holding member 400 shown in FIG. 6, marker members 411, 412, 413, diffusion plates 421, 422, 423, and light emitting substrates 431, 432, 433.

The holding member 400 is made of a material having low moisture absorption properties and a small linear expansion coefficient. The linear expansion coefficient of the holding member 400 is preferably not larger than $30 \times 10^{-6}$/K. As a material for the holding member 400, for example, glass, ceramic, metal, alloy, or glass ceramic is used. In particular, light-weight, low-cost quartz glass is preferably used. The linear expansion coefficient of quartz glass is $0.5 \times 10^{-6}$/K.

The holding member 400 has a bottom-opened boat shape, and includes a front holding part 401a, a center holding part 401b, and a rear holding part 401c. The front holding part 401a and the rear holding part 401c respectively have tabular upper surface parts 405a, 405c. The upper surface parts 405a, 405c are on the same plane. The center holding part 401b has a projection 405b projecting upward. The projection 405b includes an upper surface part 405x and a side surface part 405y. An opening 402a is formed in the upper surface part 405a of the front holding part 401a, an opening 402b is formed in the upper surface part 405x of the center holding part 401b, and an opening 402c is formed in the upper surface part 405c of the rear holding part 401c.

The upper surface parts 405a, 405x, 405c of the holding member 400 respectively overlap with the front-part upper surface 141a, the central-part upper surface 141b, and the rear-part upper surface 141c of the housing 141 of FIG. 3.

The openings 402a, 402b, 402c of the holding member 400 of FIG. 6 respectively overlap with the openings OPa, OPb, OPc of the housing 141 of FIG. 3. As shown in FIG. 3, the opening 402a is smaller than the opening OPa, and the edge of the opening 402a is inside the edge of the opening OPa. The opening 402b is smaller than the opening OPb, and the edge of the opening 402b is inside the edge of the opening OPb. The opening 402c is smaller than the opening OPc, and the edge of the opening 402c is inside the edge of the opening OPc.

The marker member 411, the diffusion plate 421, and the light emitting substrate 431 are arranged below the upper surface part 405a of the front holding part 401a. The marker member 412, the diffusion plate 422, and the light emitting substrate 432 are arranged below the upper surface part 405x of the center holding part 401b. The marker member 413, the diffusion plate 423, and the light emitting substrate 433 are arranged below the rear holding part 401c.

A plurality of circular regions CR respectively constituting the plurality of markers 143 of FIG. 3 are provided on one surfaces (upper surfaces in FIG. 6) of the marker members 411, 412, 413. The marker member 411 is arranged such that a region of the upper surface which includes three circular regions CR is exposed in the opening 402a of the front holding part 401a. The marker member 412 is arranged such that a region of the upper surface which includes two circular regions CR is exposed in the opening 402b of the center holding part 401b. The marker member 413 is arranged such that a region of the upper surface which includes two circular regions CR is exposed in the opening 402c of the rear holding part 401c. Details of the marker members 411, 412, 413 will be described later.

The diffusion plates 421, 422, 423 transmits light while diffusing the light. The diffusion plates 421, 422, 423 are made of resin, for example. A plurality of light emitting elements L are mounted on the upper surfaces of the light emitting substrates 431, 432, 433. In this example, each light emitting element L is an infrared LED (light emitting diode). In place of the infrared LED, an LED that emits light with another wavelength may be used, or another light emitting element such as a filament may be used.

Figure 7:
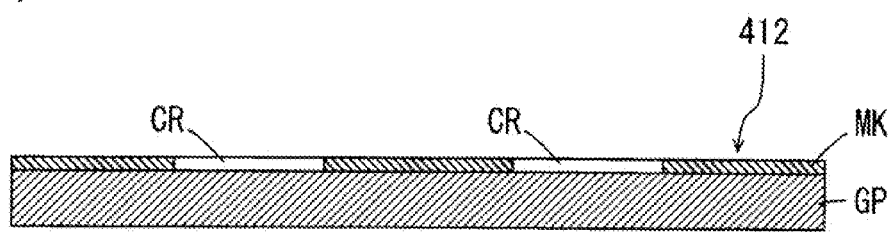
FIG. 7 is a schematic sectional view of a marker member.

Configurations of the marker members 411, 412, 413 will be described taking the marker member 412 as an example. FIG. 7 is a schematic sectional view of the marker member 412. The marker members 411, 413 have configurations similar to that of the marker member 412 shown in FIG. 7.

As shown in FIG. 7, the marker member 412 includes a plate member GP made of glass. The plate member GP has high translucency. As a material for the plate member GP, for example, quartz glass or soda glass is used. In particular, quartz glass having a small linear expansion coefficient and low moisture absorption properties is preferably used as the material for the plate member GP. The plate member GP is preferably made of the same material as that for the holding member 400 of FIG. 6. Further, as the difference in the linear expansion coefficient between the plate member GP and the holding member 400 of FIG. 6 is smaller, the temperature correction becomes easier, which is preferable. In this example, the holding member 400 and the plate member GP are both made of quartz glass.

A light shielding mask MK is formed by printing on the one surface of the plate member GP except for a plurality of circular regions CR. An outer shape of each marker 143 of FIG. 3 is formed by the mask MK. The formation by printing includes formation by sputtering or vapor deposition. Further, the mask MK may be formed by another printing method such as screen printing. As a material for the mask MK, a metal material having high absorptivity (strong adhesion) to glass is used, and for example, chromium is used. Hence, it is possible to form the mask MK having high film strength and a small film thickness on the plate member GP made of glass. Further, on a thin film of a metal material that is easily adsorbed to glass, a thin film of another metal may be formed, to thereby form the mask MK made of the laminated film having high film strength. Moreover, the mask MK may be formed using emulsion ink, another organic ink, or the like. A thickness of the mask MK may be smaller than a thickness of the plate member GP. The thickness of the mask MK is preferably not larger than 5 μm, and more preferably not larger than 200 nm.

Figure 8:
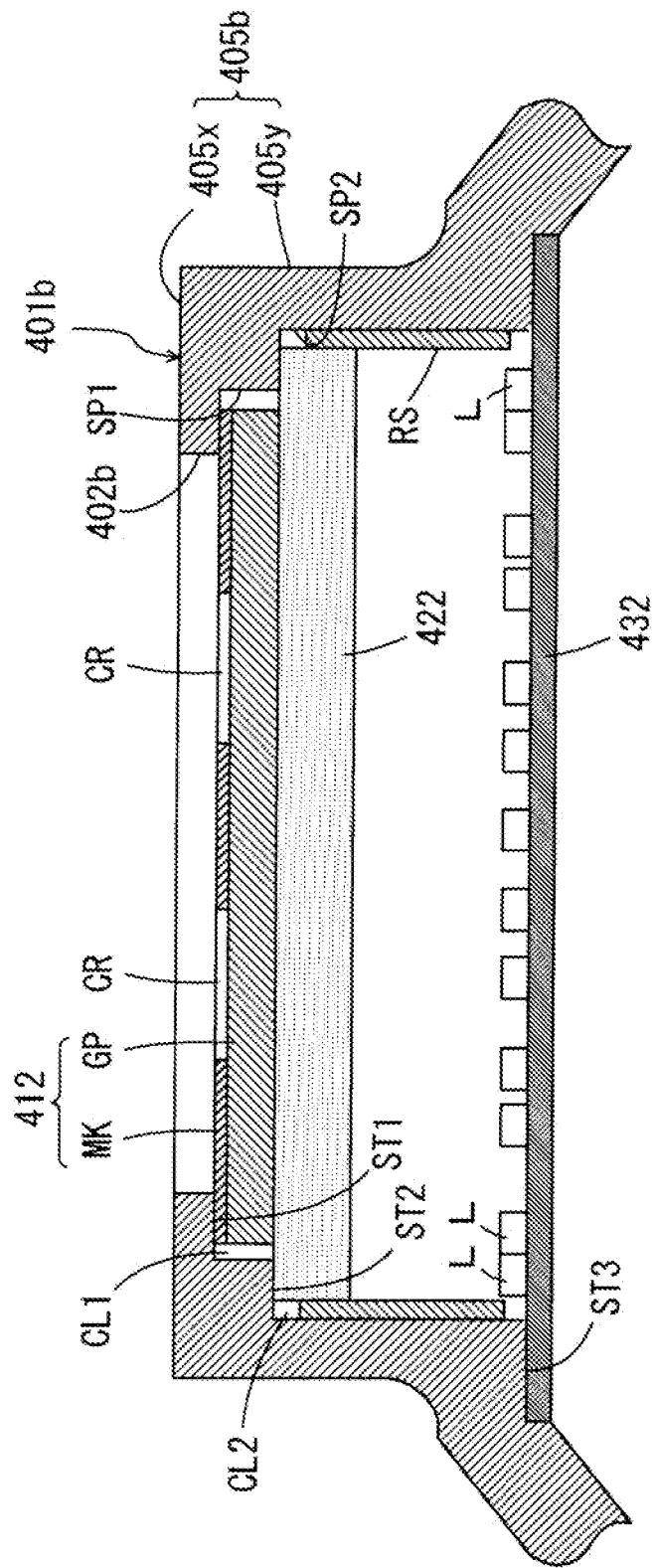
FIG. 8 is a sectional view showing the positional relationship among the marker member, a diffusion plate, and a light emitting substrate.

The positional relationship among the marker members 411, 412, 413, the diffusion plates 421, 422, 423, and the light emitting substrates 431, 432, 433 will be described taking the positional relationship among the marker member 412, the diffusion plate 422, and the light emitting substrate 432 as an example. FIG. 8 is a sectional view showing the positional relationship among the marker member 412, the diffusion plate 422, and the light emitting substrate 432. The positional relationship among the marker member 411, the diffusion plate 421, and the light emitting substrate 431 and the positional relationship among the marker member 413, the diffusion plate 423, and the light emitting substrate 433 are similar to the positional relationship among the marker member 412, the diffusion plate 422, and the light emitting substrate 432 shown in FIG. 8.

As shown in FIG. 8, an internal space of the projection 405b of the center holding part 401b is provided so as to widen gradually downward. The side surface part 405y has an upper side surface SP1 and a lower side surface SP2 as internal side surfaces. The upper side surface SP1 is located outside the edge of the opening 402b. The lower side surface SP2 is located outside the upper side surface SP1.

The marker member 412 is arranged in a region surrounded by the upper side surface SP1. The marker member 412 is larger than the opening 402b. A step part ST1 is formed so as to extend outward from the lower end of the inner peripheral surface of the opening 402b to the upper end of the upper side surface SP1. A peripheral edge of the upper surface of the marker member 412 comes into contact with the step part ST1. A gap CL1 is formed between the upper side surface SP1 and the outer peripheral surface of the marker member 412. By the gap CL1 being filled with an adhesive, the marker member 412 is fixed so as to overlap with the opening 402b. A peripheral edge of the upper surface of the marker member 412 may be bonded to the step part ST1 by the adhesive.

Note that, since the gap CL1 exists between the upper side surface SP1 and the outer peripheral surface of the marker member 412, when stress is applied to the adhesive in the gap CL1 due to dimensional changes in the holding member 400 and the marker member 412, a position of the marker member 412 may shift in the region surrounded by the upper side surface SP1. In the present embodiment, as described later, the holding member 400 and the marker member 412 have high dimensional stability. For this reason, stress is hardly applied to the adhesive in the gap CL1, thus preventing positional shift of the marker member 412.

Note that in place of the adhesion using the adhesive, the marker members 411, 412, 413 may be joined to the holding member 400 by another method such as fusion or optical contact.

The diffusion plate 422 is arranged at the upper end of a region surrounded by the lower side surface SP2. A step part ST2 is formed so as to extend outward from the lower end of the upper side surface SP1 to the upper end of the lower side surface SP2. The upper surface of the diffusion plate 422 comes into contact with the lower surface of the marker member 412 and the step part ST2. A peripheral edge of the upper surface of the diffusion plate 422 may be bonded to the step part ST2 by the adhesive. A gap CL2 is formed between the lower side surface SP2 and the outer peripheral surface of the diffusion plate 422. A cylindrical diffusion reflection sheet RS is arranged so as to vertically extend along the lower side surface SP2. The diffusion reflection sheet RS reflects light while diffusing the light. The diffusion reflection sheet RS may be bonded to the lower side surface SP2 by the adhesive. Further, a mirror sheet may be used in place of the diffusion reflection sheet RS. The upper end of the diffusion reflection sheet RS is located in the gap CL2.

A step part ST3 is formed so as to extend outward from the lower end of the lower side surface SP2. The light emitting substrate 432 is arranged so as to come into contact with the step part ST3. The light emitting substrate 432 may be fixed to the step part ST3 by the adhesive or a screw. A plurality of light emitting elements L are substantially uniformly arranged in the whole of a region of the light emitting substrate 432 which overlaps with the diffusion plate 422.

Figure 9:
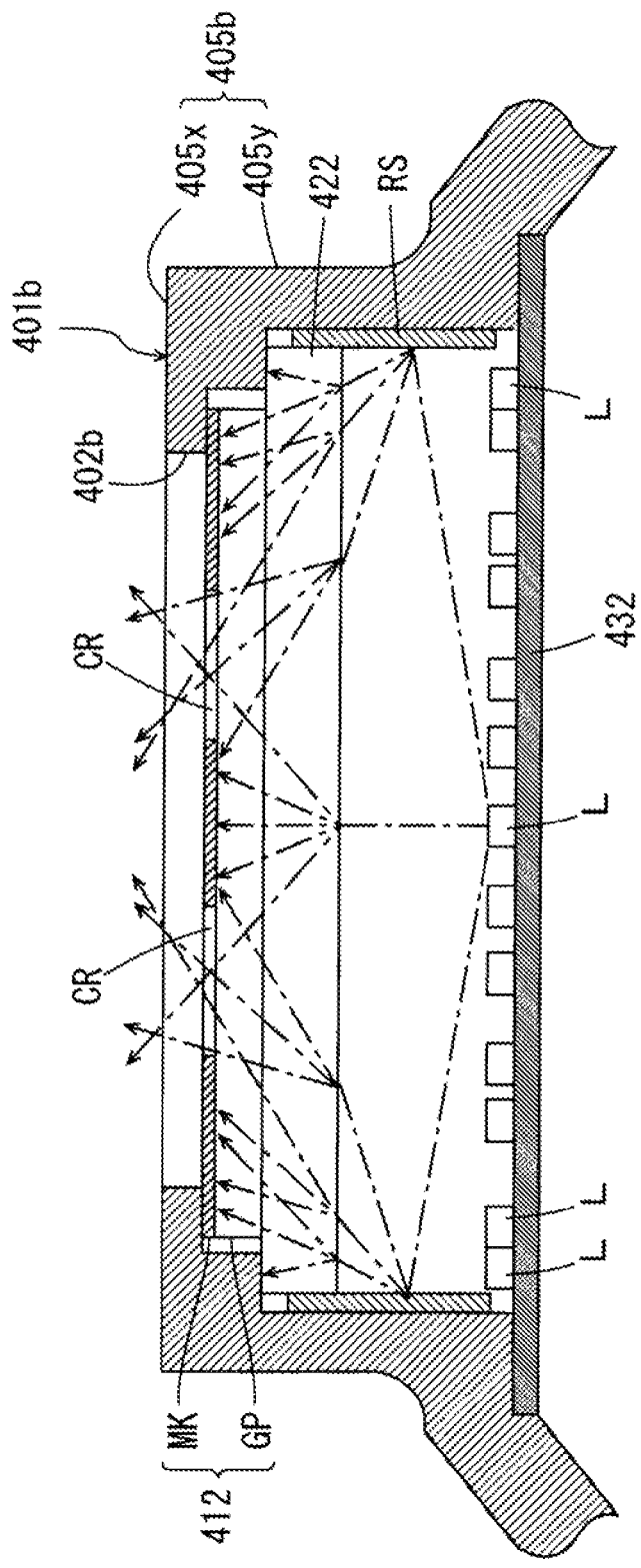
FIG. 9 is a view for describing infrared rays emitted from each light emitting element.

FIG. 9 is a view for describing infrared rays emitted from each light emitting element L. In FIG. 9, only infrared rays emitted from one light emitting element L are shown. As shown in FIG. 9, the infrared rays emitted from the light emitting element L are diffused in various directions by being reflected on the diffusion reflection sheet RS. Further, the infrared rays are diffused in various directions by being transmitted through the diffusion plate 422. Out of these infrared rays, only the infrared rays that pass through the circular region CR, which is not provided with the mask MK of the marker member 412, are emitted to the outside of the housing 141 of FIG. 3, and the other infrared rays are shielded by the mask MK or other portions in the housing 141 and not emitted to the outside of the housing 141.

Similarly, infrared rays emitted from the other light emitting elements L are also emitted to the outside of the housing 141 through the circular region CR while being diffused by the diffusion reflection sheet RS and the diffusion plate 422. Thereby, infrared rays having sufficient intensity are emitted in various directions from each marker 143 of the probe 140 of FIG. 3.

The diffusion plate 422 is preferably larger than the marker member 412. Further, the plurality of light emitting elements L are preferably uniformly arranged in a wider region than the circular region CR of the marker member 412. Specifically, with respect to one circular region CR, the plurality of light emitting elements L are preferably uniformly arranged in a region having an area twice as large as that of the circular region CR. Hence, it is possible to make uniform the intensity of infrared rays in various directions which are emitted through the circular region CR.

In the present embodiment, each of the marker members 411, 412, 413 is made of the plate member GP having high translucency, and the mask MK which is formed on one surface of the plate member GP by printing and has light shielding properties. The use of such marker members 411, 412, 413 can improve the accuracy in position specification of the marker 143 of the probe 140. Hereinafter, a reason therefor will be described.

Figure 10A:
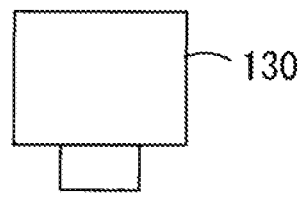
FIGS. 10A and 10B are schematic views for describing infrared rays incident on the main imaging unit.
Figure 10A:
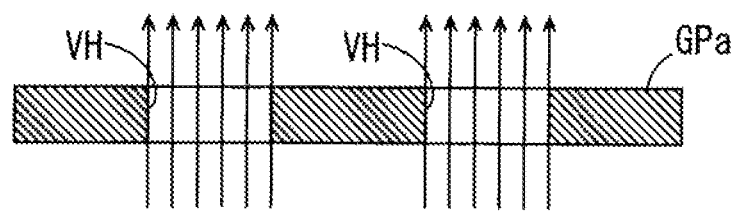
Figure 10B:
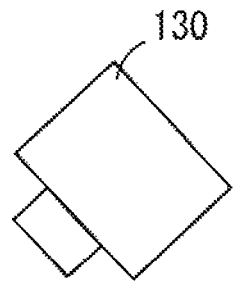
Figure 10B:
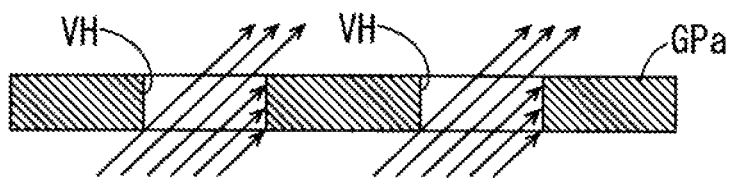

FIGS. 10A and 10B are schematic views for describing infrared rays incident on the main imaging unit 130 in the case of using a marker member as a comparative example. In the example of FIGS. 10A and 10B, a plate member GPa made of a light shielding material is used as the marker member. A through hole VH corresponding to the circular region CR is formed in the plate member GPa. The upper surface and the lower surface of the plate member GP are parallel to each other, and the through hole VH is vertical to the upper surface and the lower surface of the plate member GP. In the following description, orthogonal to or obliquely orthogonal to the plate member GP means orthogonal to or obliquely orthogonal to the upper surface and the lower surface of the plate member GP.

As shown in FIG. 10A, when the main imaging unit 130 is located above the plate member GPa, infrared rays passing through the through hole VH in a direction substantially orthogonal to the plate member GPa are incident on the main imaging unit 130. In this case, a direction of the through hole VH almost agrees with the direction of the infrared rays incident on the main imaging unit 130. For this reason, the infrared rays are incident on the main imaging unit 130 through the whole of the upper end opening of the through hole VH. Thereby, image data corresponding to a cross sectional shape of the through hole VH is obtained.

In contrast, as shown in FIG. 10B, when the main imaging unit 130 is located obliquely above the plate member GPa, infrared rays passing through the through hole VH in the direction obliquely orthogonal to the plate member GPa are incident on the main imaging unit 130. In this case, the direction of the through hole VH differs from the direction of the infrared rays incident on the main imaging unit 130. For this reason, the infrared rays are shielded by the inner peripheral surface of the through hole VH, and incident on the main imaging unit 130 through part of the upper end opening of the through hole VH. Accordingly, image data corresponding to the cross sectional shape of the through hole VH is not obtained. Hence, the position of the through hole VH cannot be accurately specified.

As described above, in the example of FIGS. 10A and 10B, when the turned direction of the marker 143 varies, the accuracy in specifying the position of the through hole VH varies. As the angle formed between the direction of the through hole VH and the direction of infrared rays incident on the main imaging unit 130 is larger, the accuracy in position specification becomes lower. Further, as the thickness of the plate member GPa is larger, the accuracy in position specification becomes lower.

Figure 11A:
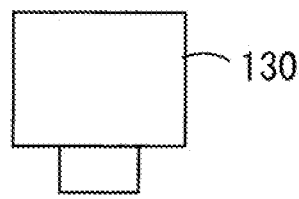
FIGS. 11A and 11B are schematic views for describing infrared rays incident on the main imaging unit.
Figure 11A:
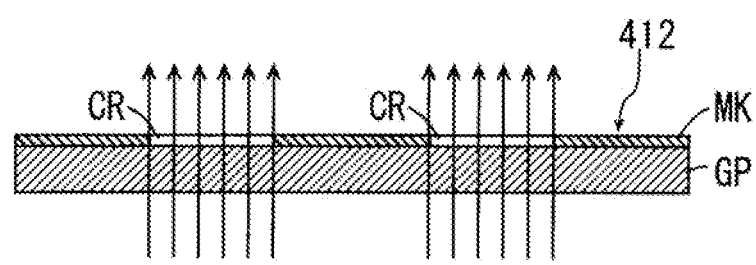
Figure 11B:
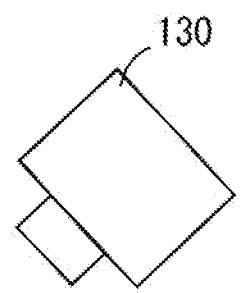
Figure 11B:
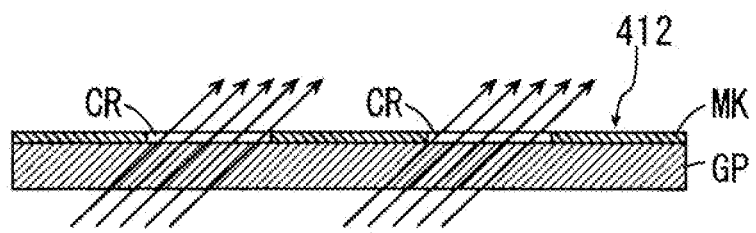

FIGS. 11A and 11B are schematic views for describing infrared rays incident on the main imaging unit 130 in the case of using the marker members 411, 412, 413 according to the present embodiment.

In the present embodiment, as shown in FIGS. 11A and 11B, either in a case where the main imaging unit 130 is located above the plate member GPa or in a case where the main imaging unit 130 is located obliquely above the plate member GPa, infrared rays are incident on the main imaging unit 130 through almost the whole of the circular region CR. This is because the thickness of the mask MK having light shielding properties can be made extremely small.

Accordingly, even when the turned direction of the marker 143 varies, image data corresponding to the shape of the circular region CR can be obtained. This prevents deterioration in accuracy in position specification of the marker 143 due to the turned direction of the marker 143, to keep the accuracy in position specification of the marker 143 high.

Figure 12:
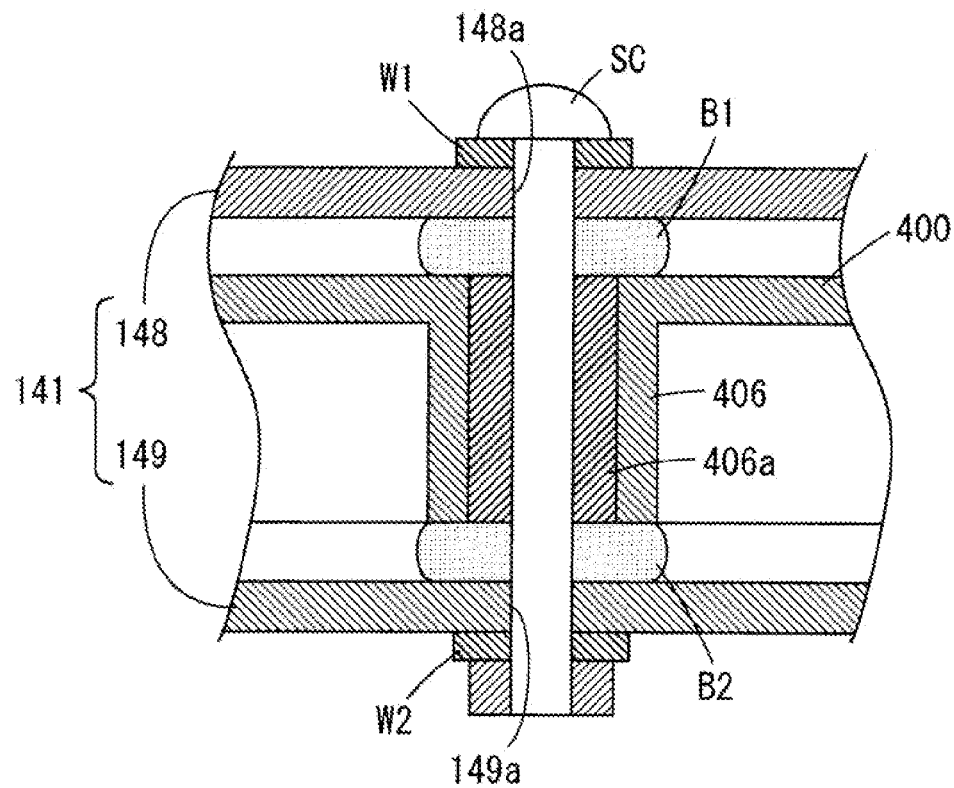
FIG. 12 is a schematic sectional view for describing a holding structure of a holding member in the housing.

FIG. 12 is a schematic sectional view for describing a holding structure of the holding member 400 in the housing 141. As shown in FIG. 12, the housing 141 includes an upper housing 148 and a lower housing 149. The holding member 400 is housed in an internal space formed by the upper housing 148 and the lower housing 149.

Through holes 148a, 149a are respectively formed in the upper housing 148 and the lower housing 149. A cylindrical insertion section 406 is provided in the holding member 400. As shown in FIG. 6, two insertion sections 406 are provided in the front holding part 401a of the holding member 400, and one insertion section 406 is provided in the rear holding part 401c. These three insertion sections 406 and peripheral portions thereof have configurations similar to each other.

As shown in FIG. 12, for example, a cylindrical collar 406a made of metal is inserted into the insertion section 406. A screw SC is inserted through a through hole 148a of the upper housing 148, the collar 406a, and a through hole 149a of the lower housing 149, and a nut NT is attached to the front end of the screw SC. A washer W1 is arranged between the upper surface of the upper housing 148 and a head of the screw SC, and a washer W2 is arranged between the lower surface of the lower housing 149 and the nut NT.

A bushing B1 having flexibility is arranged in a gap formed between the lower surface of the upper housing 148 and the upper ends of the insertion section 406 and the collar 406a. Further, a bushing B2 having flexibility is arranged in a gap formed between the upper surface of the lower housing 149 and the lower ends of the insertion section 406 and the collar 406a. The bushings B1, B2 are each made of a gel material, for example. The bushings B1, B2 may be formed of other materials such as rubber or sponge.

In this case, even when an impact is applied to the housing 141 due to falling, collision, or the like of the probe 140, the impact transmitted from the housing 141 to the holding member 400 is reduced by the bushings B1, B2. This prevents damage to the holding member 400.

(5) Measurement Examples

Figure 13:
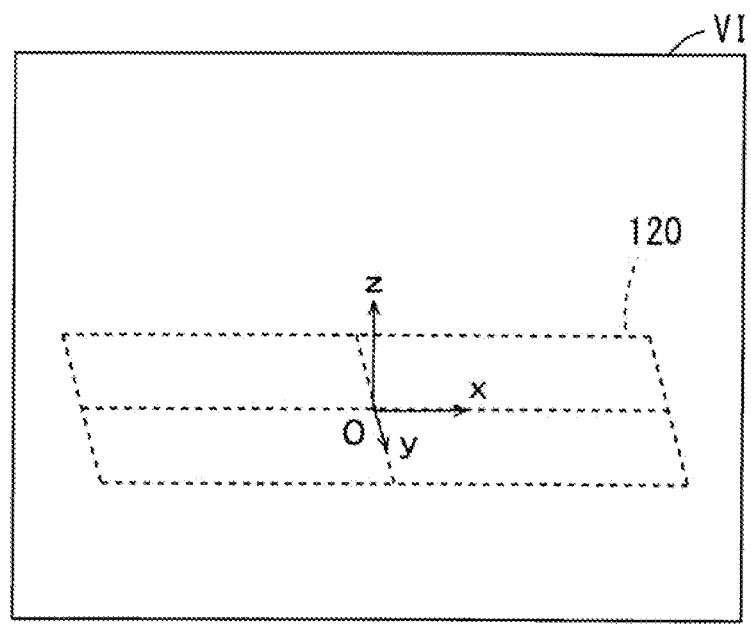
FIG. 13 is a view showing one example of an image displayed on a display unit of FIG. 2.
Figure 14:
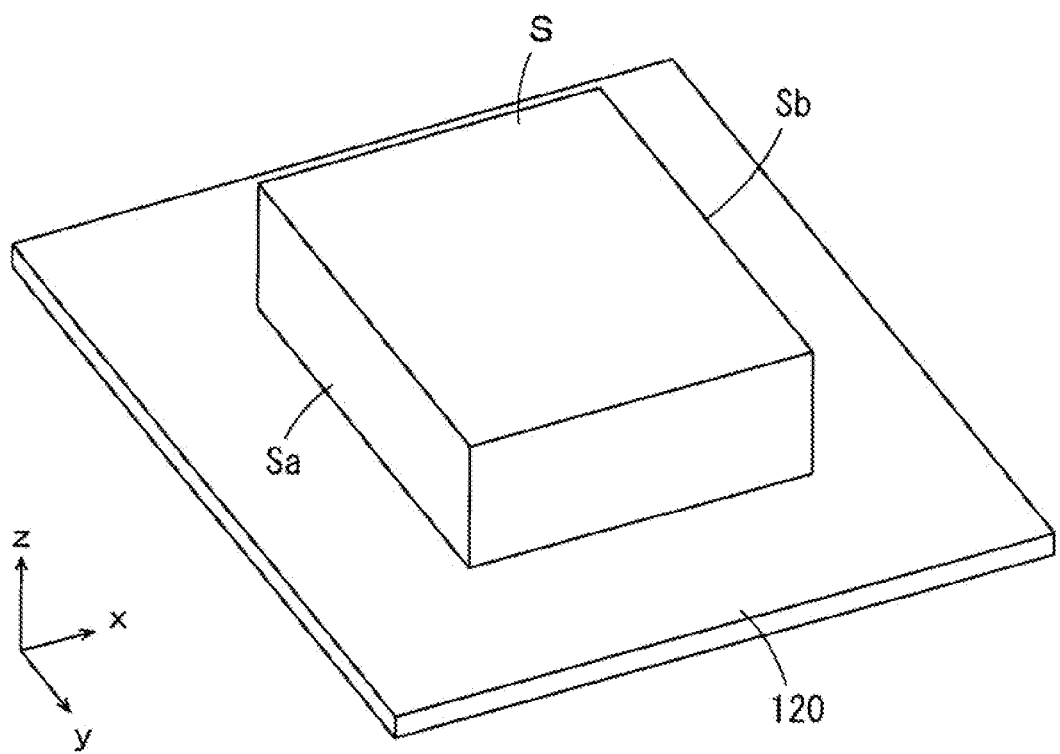
FIG. 14 is a view showing one example of a measurement target.

There will be described examples of measuring a size of the measurement target S by the optical coordinate measuring device 300. FIG. 13 is a view showing one example of an image displayed on the display unit 160 of FIG. 2. FIG. 14 is a view showing one example of the measurement target S.

FIG. 13 shows an image (hereinafter referred to as imaging-region virtual image) W that virtually represents the imaging region V. As described above, the x-axis, the y-axis, and the z-axis are each set in the imaging region V. In this example, the x-axis and the y-axis are set so as to be parallel to the upper surface of the placement table 120 and orthogonal to each other, and the z-axis is set vertically to the upper surface of the placement table 120. Further, the center of the placement table 120 is set at an origin O. The imaging-region virtual image VI of FIG. 13 includes lines (dotted lines of FIG. 13) representing an outer periphery of the placement table 120, while including the origin O, the x-axis, the y-axis, and the z-axis.

The measurement target S of FIG. 14 has a rectangular parallelepiped shape. In this example, a distance between one side surface Sa of the measurement target S and a side surface Sb opposite to the side surface Sa is measured. The side surfaces Sa, Sb of the measurement target S are each vertical to the x-axis.

Figure 15A:
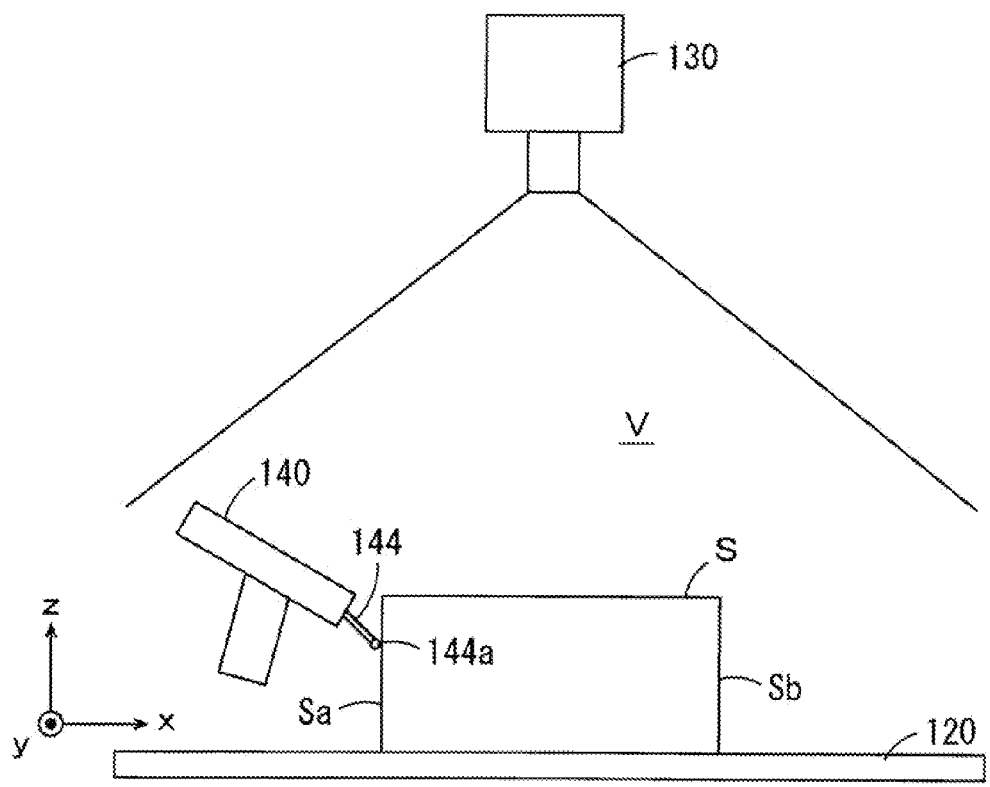
FIGS. 15A and 15B are views for describing the measurement example.
Figure 15B:
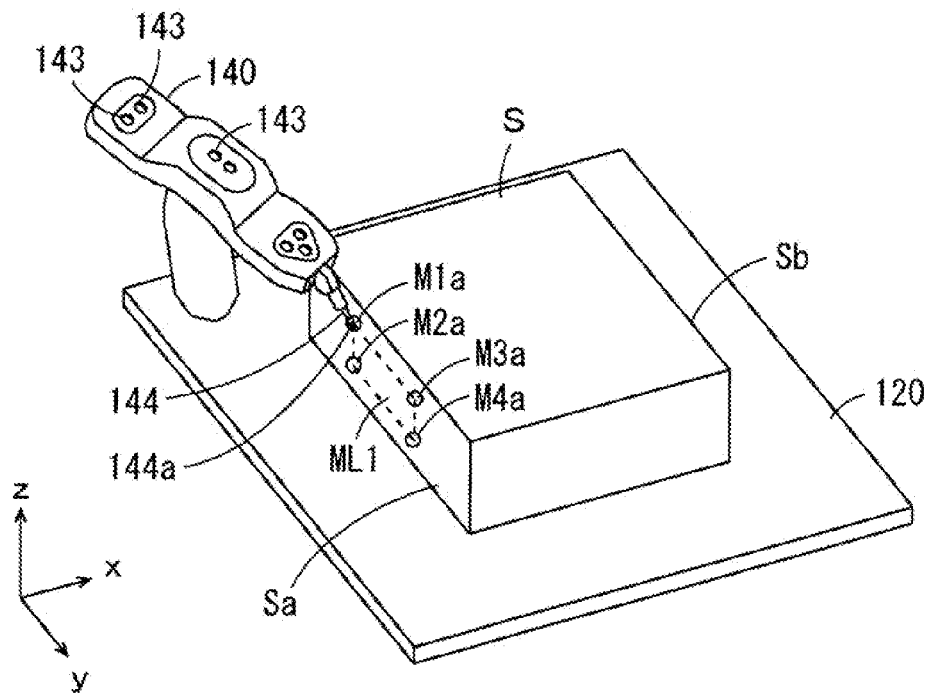
Figure 16:
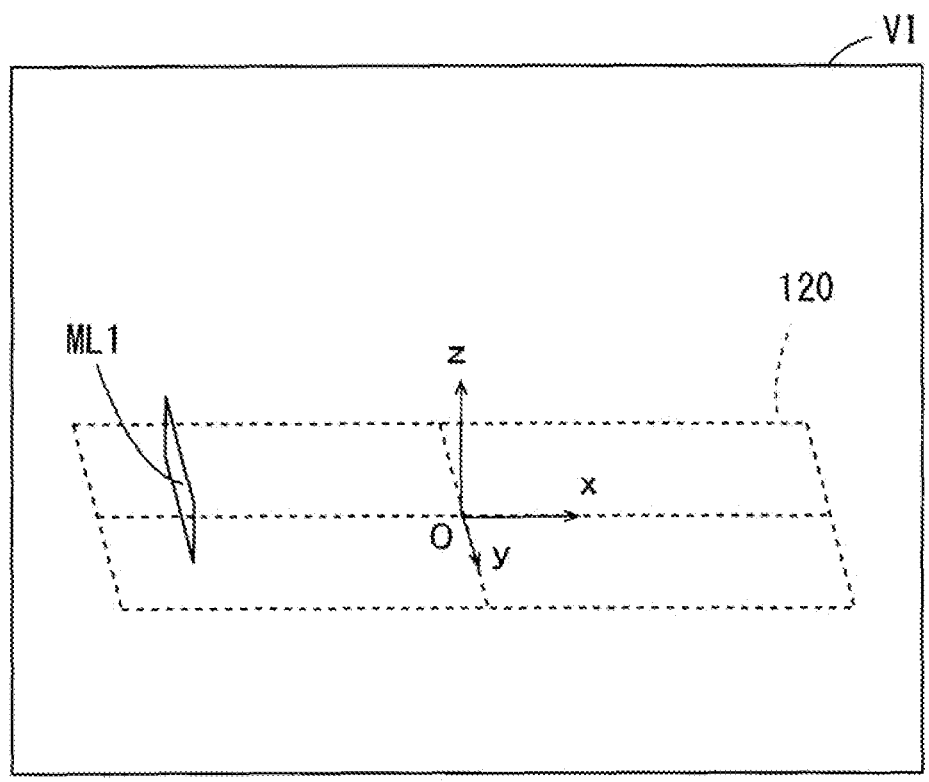
FIG. 16 is a view for describing the measurement example.
Figure 17A:
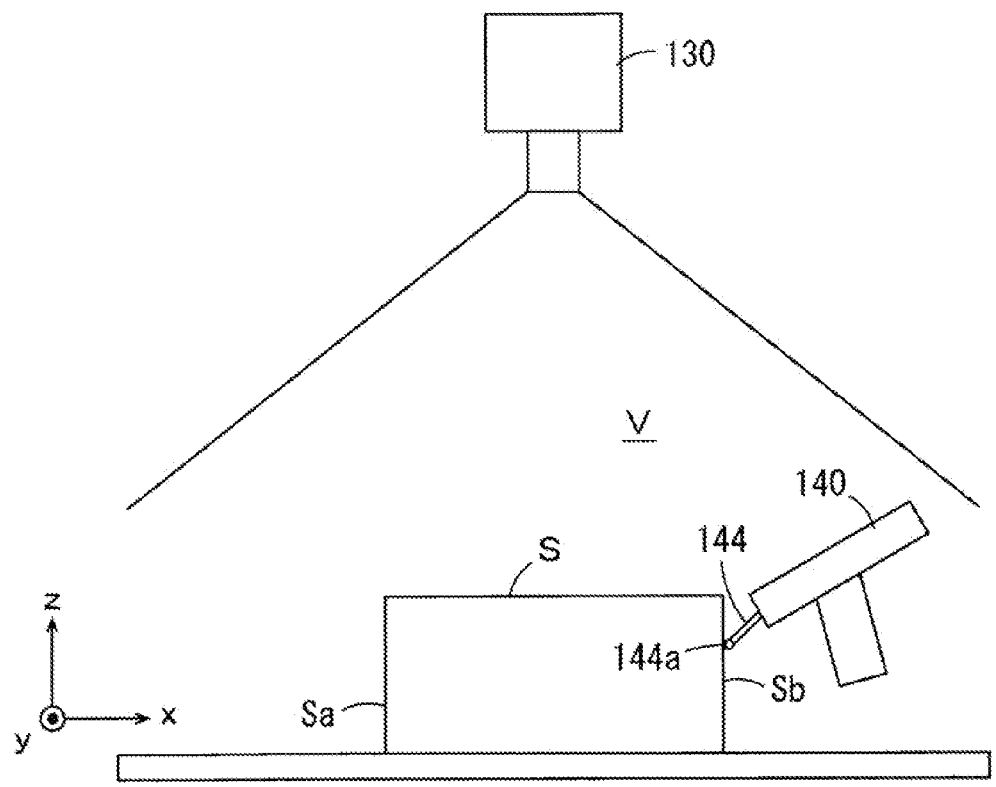
FIGS. 17A and 17B are views for describing a measurement example.
Figure 17B:
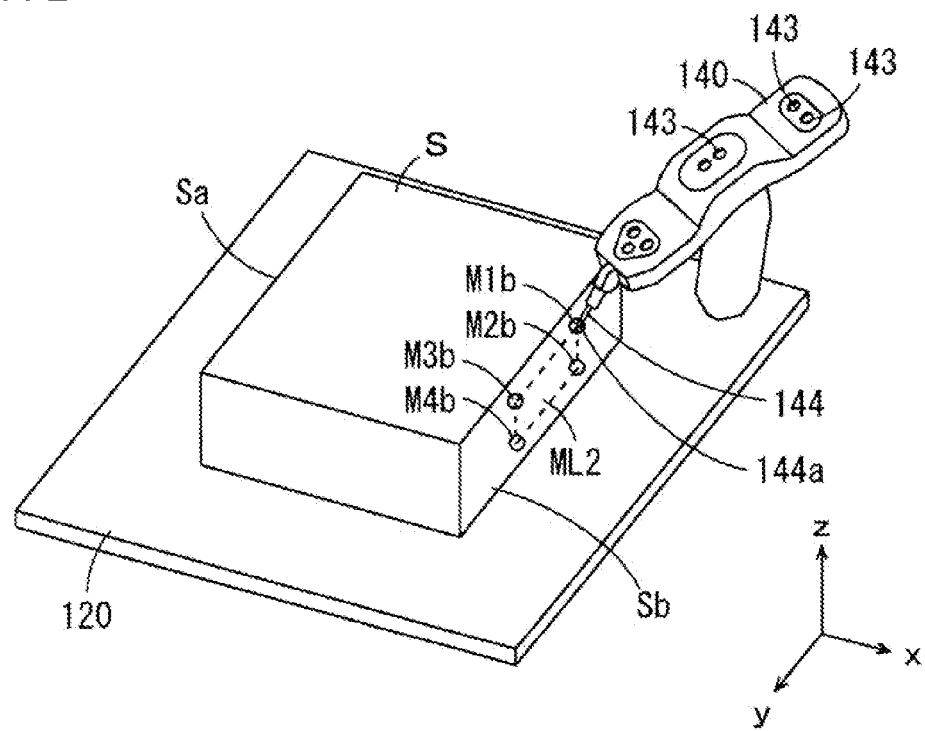
Figure 18:
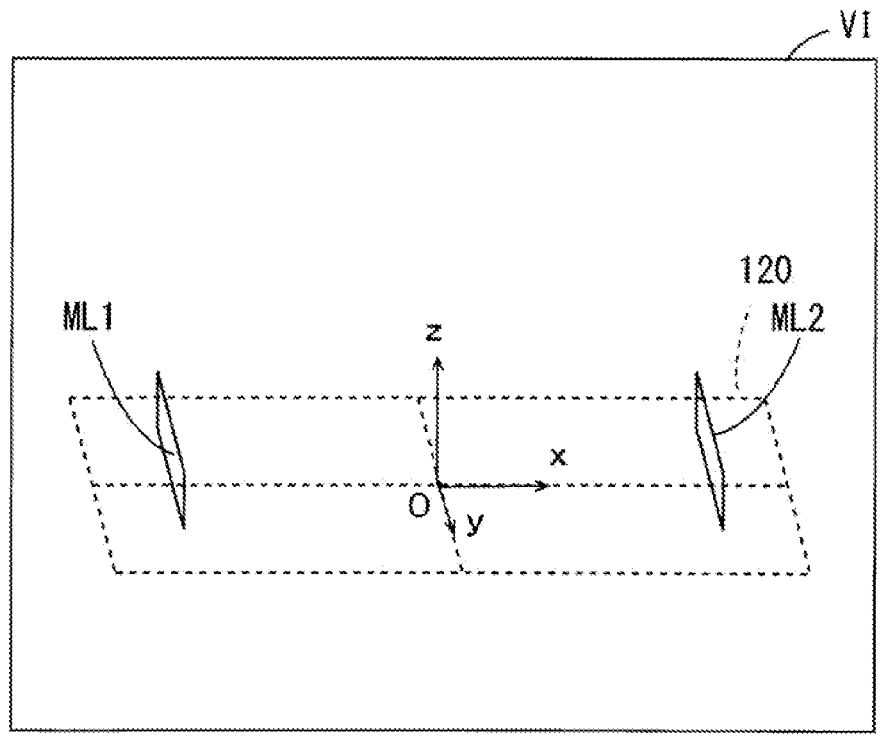
FIG. 18 is a view for describing the measurement example.
Figure 19:
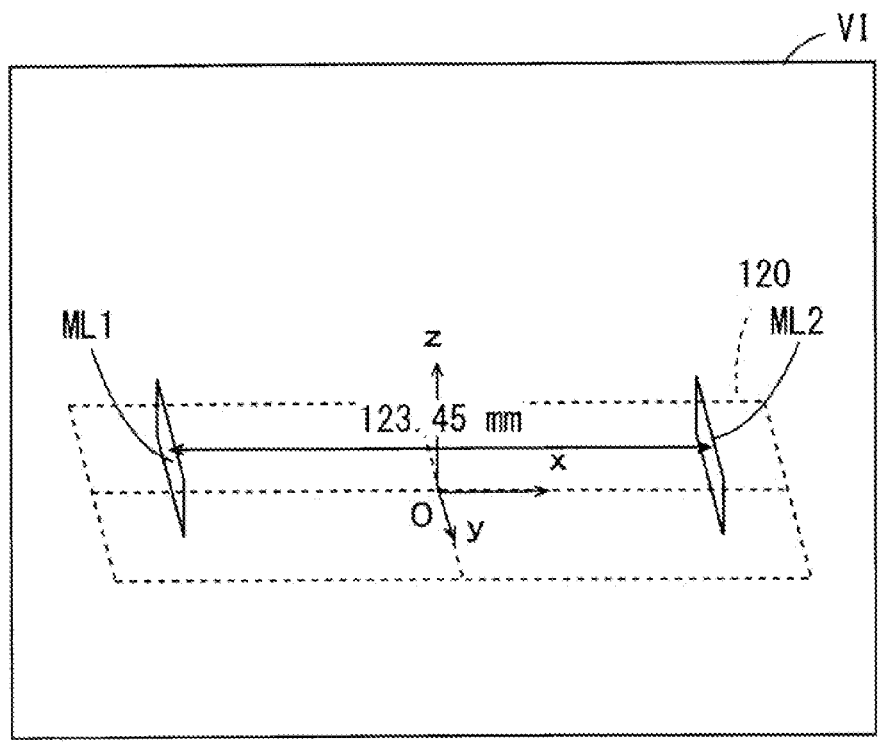
FIG. 19 is a view for describing the measurement example.

FIGS. 15 to 19 are views for describing specific measurement examples in the measurement target S of FIG. 14. FIGS. 15A and 17A are front views showing the positional relationship among the placement table 120, the main imaging unit 130, the probe 140, and the measurement target S, and FIGS. 15B and 17B are external perspective views of the probe 140 and the measurement target S. FIGS. 16, 18, and 19 show examples of the imaging-region virtual image VI displayed on the display unit 160.

As shown in FIGS. 15A and 15B, the contact part 144a of the stylus 144 is brought into contact with the side surface Sa of the measurement target S such that the plurality of markers 143 of the probe 140 are located within the imaging region V. By the operation unit 170 of FIG. 1 being operated under this state, the contact position between the measurement target S and the contact part 144a is set as a measurement position M1a, as shown in FIG. 15B. In this case, coordinates of the measurement position M1a are specified.

Similarly, three positions on the side surface Sa of the measurement target S are set as measurement positions M2a, M3a, M4a, and coordinates of the measurement positions M2a, M3a, M4a are specified. Subsequently, by the operation unit 170 or the operation unit 230 of FIG. 1 being operated, a plane passing through the measurement positions M1a to M4a is set as a measurement plane ML1 corresponding to the side surface Sa of the measurement target S. In this case, as shown in FIG. 16, the set measurement plane ML1 is superimposed on the imaging-region virtual image VI.

Subsequently, as shown in FIGS. 17A and 17B, the contact part 144a of the stylus 144 is brought into contact with the side surface Sb of the measurement target S such that the plurality of markers 143 of the probe 140 are located within the imaging region V. By the operation unit 170 of FIG. 1 being operated under this state, the contact position between the measurement target S and the contact part 144a is set as a measurement position M1b, as shown in FIG. 17B. In this case, coordinates of the measurement position M1b are specified.

Similarly, three positions on the side surface Sb of the measurement target S are set as measurement positions M2b, M3b, M4b, and coordinates of the measurement positions M2b, M3b, M4b are specified. Subsequently, by the operation unit 170 or the operation unit 230 of FIG. 1 being operated, a plane passing through the measurement positions M1b to M4b is set as a measurement plane ML2 corresponding to the side surface Sb of the measurement target S. In this case, as shown in FIG. 18, the set measurement plane ML2 is superimposed on the imaging-region virtual image VI in addition to the measurement plane ML1.

Subsequently, by the operation unit 170 or the operation unit 230 of FIG. 1 being operated, a distance between the decided measurement planes ML1 and ML2 is calculated in the control unit 220 of FIG. 1, and as shown in FIG. 19, the calculation result is displayed on the imaging-region virtual image VI. Note that the calculation result may be displayed on the display unit 160 separately from the imaging-region virtual image VI. Further, a condition for calculation of the distance between the two measurement planes and the like may be appropriately set by the user.

Although one measurement plane is decided based on the four measurement positions in this example, one measurement plane can be set based on three measurement positions at the minimum. Meanwhile, by setting four or more measurement positions, it is possible to more accurately set the measurement plane corresponding to the measurement target S. Further, based on four or more measurement positions, it is also possible to obtain the flatness of the plane of the measurement target S.

Moreover, although the plane (measurement plane) passing through the designated plurality of positions (measurement positions) is set as the target for measurement in this example, another geometrical shape may be set as the target for measurement in accordance with the shape of the measurement target. For example, a cylinder, a sphere, or the like passing through the designated plurality of positions may be set as the target for measurement. In this case, a diameter of a cross section of the set cylinder, a radius of the set sphere, or the like can be obtained. Further, an angle, an area, or the like with respect to the set geometrical shape may be obtained.

(6) Example of Use of Imaging Unit

By capturing an image of the measurement target S by the sub-imaging unit 150 of FIG. 3, the image of the measurement target S can be displayed on the display unit 160. Hereinafter, the image obtained by the sub-imaging unit 150 is referred to as a captured image.

The positional relationships between the plurality of markers 143 and the sub-imaging unit 150 and features (angle of view, distortion, etc.) of the sub-imaging unit 150 are previously stored as imaging information into the storage unit 210 of FIG. 1, for example. Accordingly, when the plurality of markers 143 are within the imaging region V, an image of a region captured by the sub-imaging unit 150 is recognized by the control unit 220 of FIG. 1. That is, a three-dimensional space corresponding to the captured image is recognized by the control unit 220.

As described above, information concerning the measurement (hereinafter referred to as measurement information) such as the measurement position and the measurement plane is set in the three-dimensional space. In the present embodiment, the measurement information can be associated with the captured image, and the measurement information can be superimposed and displayed on the captured image.

Figure 20:
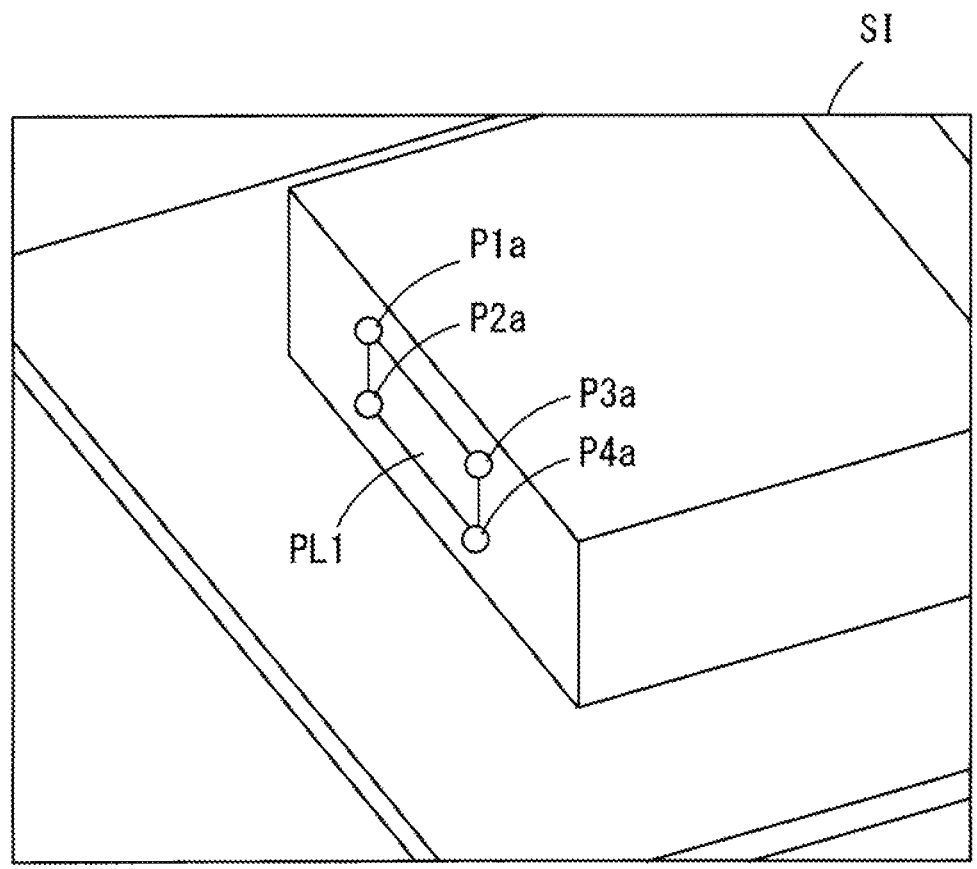
FIG. 20 is a view showing an example in which measurement information is superimposed and displayed on a captured image.

FIG. 20 is a view showing an example in which measurement information is superimposed and displayed on a captured image. In the example of FIG. 20, an image of the side surface Sa of the measurement target S is captured by the sub-imaging unit 150. On this captured image SI, an image PL1 representing the measurement plane ML1 is superimposed and a plurality of spherical images P1a to P4a representing the measurement positions M1a to M4a are also superimposed.

Thus, by superimposing the measurement information on the captured image obtained by actually capturing the image of the measurement target S, the user can easily visually grasp the measurement information. Further, in the case of performing measurement on one measurement target S and thereafter performing similar measurement on another measurement target S, the measurement on another measurement target S can be easily performed by referring to the captured image superimposed with the measurement information.

(7) Effect

In the optical coordinate measuring device 300 according to the above embodiment, the marker members 411, 412, 413 constituting the plurality of markers 143 of the probe 140 are held by the holding member 400.

In this case, the plate members GP of the marker members 411, 412, 413 are made of glass, thereby preventing time-dependent dimensional changes in the marker members 411, 412, 413 due to moisture absorption. Further, the positional relationship among the plurality of marker members 411, 412, 413 can be kept constant by the holding member 400.

Moreover, the plate member GP and the holding member 400 are each formed of quartz glass having a small linear expansion coefficient and low moisture absorption properties, thereby sufficiently preventing dimensional changes in the marker members 411, 412, 413 and the holding member 400 due to heat and moisture absorption. Furthermore, there hardly occurs distortion between the marker members 411, 412, 413 and the holding member 400 due to a difference in the linear expansion coefficient therebetween. This increases the dimensional stability of the marker members 411, 412, 413 and the holding member 400.

Further, in each of the marker members 411, 412, 413, the mask MK having light shielding properties is formed in a region on one surface of the plate member GP except for the circular region CR. In this case, the thickness of the mask MK can be made small, thereby preventing the mask MK from shielding the infrared rays which are to pass through the circular region CR and emitted to the outside of the probe 140. Hence, it is possible to prevent distortion of an outer shape of an image of the marker 143 obtained by imaging, so as to accurately capture an image of the position of each marker 143.

It is thereby possible to accurately calculate the measurement position designated by the probe 140 based on the image data of the plurality of markers 143 generated by the main imaging unit 130.

Further, in the above embodiment, the diffusion plates 421, 422, 423 are arranged between the light emitting substrates 431, 432, 433 and the marker members 411, 412, 413, and the diffusion reflection sheet RS is arranged so as to surround respective spaces between the light emitting substrates 431, 432, 433 and the marker members 411, 412, 413. Hence, it is possible to uniformly emit infrared rays in various directions through the circular regions CR of the marker members 411, 412, 413.

(8) Other Embodiments (8-1)

In the above embodiment, the holding member 400 and the marker members 411, 412, 413 are separate members, but the holding member 400 and the marker members 411, 412, 413 may be an integrated member. In this case, there are prevented occurrence of distortion between the holding member 400 and the marker members 411, 412, 413 and occurrence of positional displacement in the marker members 411, 412, 413 with respect to the holding member 400. Accordingly, a change in positional relationship among the plurality of markers 143 is more sufficiently prevented.

(8-2)

In the above embodiment, the diffusion plates 421, 422, 423 and the light emitting substrates 431, 432, 433 are respectively provided so as to correspond to the marker members 411, 412, 413, but the present invention is not limited thereto. The number of marker members may not agree with the number of diffusion plates. Similarly, the number of marker members may not agree with the number of light emitting substrates.

For example, light diffused from one diffusion plate may be emitted from the probe 140 through a plurality of marker members, or light diffused by a plurality of diffusion plates may be emitted from the probe 140 through one marker member. Similarly, light emitted by one light emitting substrate may be emitted from the probe 140 through a plurality of marker members, or light diffused by a plurality of light emitting substrates may be emitted from the probe 140 through one marker member.

(8-3)

In the above embodiment, the diffusion plates 421, 422, 423 and the diffusion reflection sheet RS are used in order to diffuse light emitted by the light emitting substrates 431, 432, 433, but the present invention is not limited thereto. When positions of the plurality of markers 143 are detectable, either the diffusion plates 421, 422, 423 or the diffusion reflection sheet RS, or both of them, may not be used.

(8-4)

The above embodiment is the example of applying the present invention to a single-camera optical coordinate measuring device in which an image of the probe is captured by one imaging unit to measure coordinates of a measurement position. However, the present invention may be applied to a multi-camera optical coordinate measuring device in which an image of the probe is captured by a plurality of imaging units to measure coordinates of a measurement position.

(9) Correspondence Relationship Between Each Constitutional Element of Claims and Each Part of Embodiments Hereinafter, examples of the correspondence between each constitutional element of the claims and each part of the embodiments will be described, but the present invention is not limited to the following examples.

In the above embodiment, the optical coordinate measuring device 300 is an example of the optical coordinate measuring device, the marker 143 is an example of the marker, the probe 140 is an example of the probe, the main imaging unit 130 is an example of the imaging unit, the control unit 220 is an example of the calculation unit, the light emitting element L is an example of the light source, the circular region CR is an example of the light transmitting region, the plate member GP is an example of the light transmitting portion, the mask MK is an example of the light shielding film, the holding member 400 is an example of the holding part, the diffusion plates 421, 422, 423 are examples of the diffusion member, the housing 141 is an example of the housing, and the bushings B1, B2 are examples of the buffer member.

As each constitutional element of the claims, there can also be used other various elements having configurations or functions recited in the claims.

The present invention can be effectively used for measuring sizes and the like of various measurement targets.

What is claimed is:

1. An optical coordinate measuring device comprising:
   a probe configured to designate a measurement position, and having a plurality of markers;
   an imaging unit configured to capture an image including the plurality of markers to generate image data; and
   a calculation unit configured to calculate a coordinate point of a measurement position designated by the probe based on the plurality of markers in the image data generated by the imaging unit,
   wherein the probe includes
   a light source,
   a plurality of light transmitting portions each having a light transmitting region corresponding to each of the markers, each having a planar outer surface, and including glass that transmits light emitted by the light source,
   a light shielding film formed on each of the planar outer surface of the plurality of light transmitting portions except for each of the light transmitting regions so as to form an outer shape of the marker, and
   a holding part configured to hold the plurality of light transmitting portions.

2. The optical coordinate measuring device according to claim 1, wherein the holding part is made of one or a plurality of materials selected from glass, metal, alloy, ceramic, and glass ceramic.

3. The optical coordinate measuring device according to claim 1, wherein the holding part is made of quartz glass.

4. The optical coordinate measuring device according to claim 1, wherein the plurality of light transmitting portions and the holding part are made of the same material.

5. The optical coordinate measuring device according to claim 1, wherein each of the light transmitting portions is made of plate glass.

6. The optical coordinate measuring device according to claim 1, wherein the light shielding film is a vapor deposition film.

7. The optical coordinate measuring device according to claim 1, wherein the respective planar outer surfaces of the light transmitting portions are disposed in parallel to each other.

8. The optical coordinate measuring device according to claim 1, wherein the imaging unit is a single camera, and each of the planar outer surfaces of the light transmitting portions faces a common direction.

9. The optical coordinate measuring device according to claim 8, wherein the probe further includes a housing having an opening corresponding to each of the markers on one side of the housing, and a grip part projects along a first direction on the other side of the housing.

10. The optical coordinate measuring device according to claim 1, wherein the probe further includes a housing configured to cover the holding part, and a grip part projects along a first direction distinct from a second direction parallel to the planar outer surfaces of the light transmitting portions.

11. The optical coordinate measuring device according to claim 1, wherein the probe further includes a diffusion member which is provided between the light source and each of the light transmitting portions, and which diffuses and transmits light emitted by the light source.

12. The optical coordinate measuring device according to claim 1, wherein the probe further includes a housing which houses the holding part, and a buffer member having flexibility is arranged between the holding part and the housing.

* * * * *